(12) United States Patent
Motadel et al.

(10) Patent No.: US 10,888,859 B2
(45) Date of Patent: Jan. 12, 2021

(54) METHOD OF MANUFACTURE OF MULTIPLE TUBE DEVICES

(71) Applicant: BIOTIX, INC., San Diego, CA (US)

(72) Inventors: Arta Motadel, San Diego, CA (US); Peter Paul Blaszcak, San Diego, CA (US)

(73) Assignee: BIOTIX, INC., San Diego, CA (US)

( * ) Notice: Subject to any disclaimer, the term of this patent is extended or adjusted under 35 U.S.C. 154(b) by 0 days.

(21) Appl. No.: 16/831,718

(22) Filed: Mar. 26, 2020

(65) Prior Publication Data

US 2020/0222895 A1    Jul. 16, 2020

Related U.S. Application Data

(63) Continuation of application No. 15/034,837, filed as application No. PCT/US2014/064367 on Nov. 6, 2014, now Pat. No. 10,639,626.

(60) Provisional application No. 61/901,334, filed on Nov. 7, 2013.

(51) Int. Cl.
   *B01L 3/00*   (2006.01)
   *G01N 1/34*   (2006.01)
   *G01N 30/60*  (2006.01)

(52) U.S. Cl.
   CPC ........... *B01L 3/502* (2013.01); *G01N 1/34* (2013.01); *B01L 3/5021* (2013.01); *B01L 2200/026* (2013.01); *B01L 2200/12* (2013.01); *B01L 2300/0654* (2013.01); *B01L 2300/0681* (2013.01); *B01L 2300/087* (2013.01); *B01L 2300/0832* (2013.01); *B01L 2300/12* (2013.01); *B01L 2300/16* (2013.01); *B01L 2400/0406* (2013.01); *B01L 2400/0409* (2013.01); *B01L 2400/0457* (2013.01); *G01N 30/6091* (2013.01)

(58) Field of Classification Search
   None
   See application file for complete search history.

(56) References Cited

U.S. PATENT DOCUMENTS

| 4,157,723 | A | 6/1979 | Granzow et al. |
| 4,605,536 | A | 8/1986 | Kuhnert et al. |
| 5,549,552 | A | 8/1996 | Peters et al. |
| 10,639,626 | B2* | 5/2020 | Motadel .................. G01N 1/34 |
| 2006/0247675 | A1 | 11/2006 | Becker et al. |
| 2007/0017927 | A1 | 1/2007 | D'Amore et al. |

(Continued)

FOREIGN PATENT DOCUMENTS

| WO | WO 2008/050165 A1 | 5/2008 |
| WO | WO 2011/116230 A2 | 9/2011 |

(Continued)

OTHER PUBLICATIONS

ASTM D1238-04—Standard Test Method for Melt Flow Rates of Thermoplastics by Extrusion Plastometer, ASTM International, West Conshohocken, PA, (2004), www.astm.org, 13 pages.

(Continued)

*Primary Examiner* — Lyle Alexander
*Assistant Examiner* — Bryan Kilpatrick
(74) *Attorney, Agent, or Firm* — Grant IP, Inc.

(57) ABSTRACT

Provided in part herein are multiple-tube devices that contain a region of reduced wall thickness, which devices facilitate biological fluid processing and analysis. Also provided in part herein are methods of manufacturing and using such devices.

13 Claims, 16 Drawing Sheets

(56) References Cited

U.S. PATENT DOCUMENTS

| 2007/0269829 | A1 | 11/2007 | Yamashita et al. |
| 2011/0088493 | A1 | 4/2011 | Blumentritt et al. |
| 2013/0123661 | A1 | 5/2013 | Dewaele et al. |
| 2013/0130369 | A1 | 5/2013 | Wilson et al. |
| 2016/0271605 | A1 | 9/2016 | Motadel et al. |

FOREIGN PATENT DOCUMENTS

| WO | WO 2012/094625 A2 | 7/2012 |
| WO | WO 2015/069911 A1 | 5/2015 |

OTHER PUBLICATIONS

Extended European Search Report dated Jun. 8, 2017 in Europe Patent Application No. 14860033.1, filed on Nov. 6, 2014, 9 pages.
International Preliminary Report on Patentability dated May 19, 2016 in International Patent Application No. PCT/US2014/064367, filed on Nov. 6, 2014, 6 pages.
International Search Report and Written Opinion dated Mar. 13, 2015 in International Patent Application No. PCT/US2014/064367, filed on Nov. 6, 2014, 8 pages.
Office Action dated Jan. 6, 2020 in U.S. Appl. No. 15/034,837, filed May 5, 2016 and published as US 2016-0271605 on Sep. 22, 2016, 8 pages.
Office Action dated Jun. 12, 2019 in U.S. Appl. No. 15/034,837, filed May 5, 2016 and published as US 2016-0271605 on Sep. 22, 2016, 10 pages.
Office Action dated Sep. 27, 2018 in U.S. Appl. No. 15/034,837, filed May 5, 2016 and published as US 2016-0271605 on Sep. 22, 2016, 10 pages.

\* cited by examiner

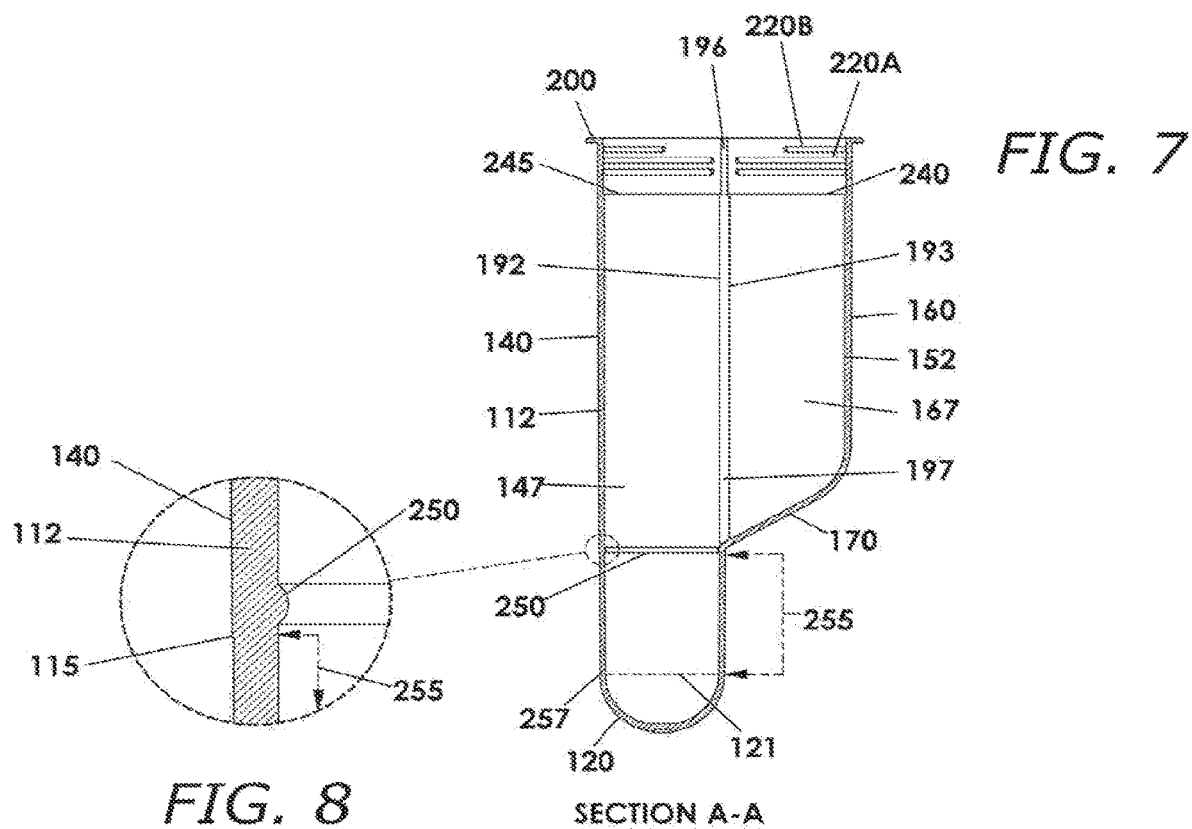
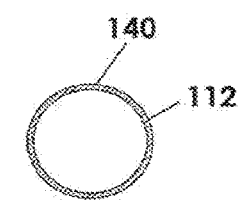
FIG. 7
FIG. 8
SECTION A-A
FIG. 9A
SECTION B-B

SECTION C-C

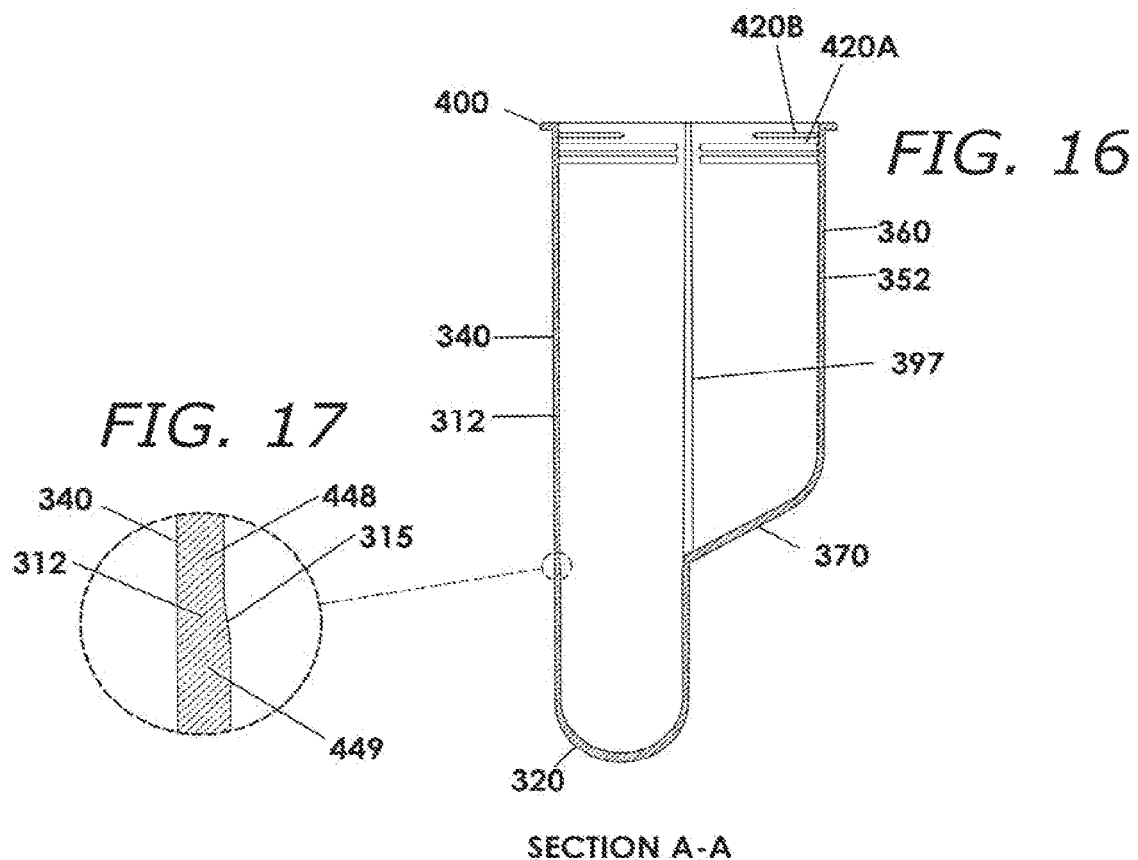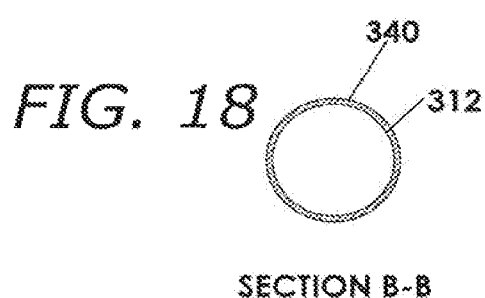

SECTION A-A

SECTION B-B

SECTION A-A

SECTION B-B

METHOD OF MANUFACTURE OF MULTIPLE TUBE DEVICES

RELATED PATENT APPLICATIONS

This patent application is a continuation of patent application Ser. No. 15/034,837 (now U.S. Pat. No. 10,639,626 B2), filed on May 5, 2016, entitled MULTIPLE TUBE DEVICES AND METHODS OF MANUFACTURE AND USE, naming Arta Motadel and Peter Paul Blaszcak as inventors, and designated by Attorney Docket No. PEL-1018-US, which is a 35 U.S.C. 371 national phase patent application of PCT/US2014/064367, filed on Nov. 6, 2014, entitled MULTIPLE TUBE DEVICES AND METHODS OF MANUFACTURE AND USE, naming Arta Motadel and Peter Paul Blaszcak as inventors, designated by Attorney Docket No. PEL-1018-PC, which claims the benefit of U.S. provisional application No. 61/901,334, filed on Nov. 7, 2013, entitled MULTIPLE TUBE DEVICES AND METHODS OF MANUFACTURE AND USE, naming Arta Motadel and Peter Paul Blaszcak as inventors, and designated by Attorney Docket No. PEL-1018-PV. The entire content of this provisional patent application is incorporated herein by reference, including all text, tables and drawings.

FIELD

The technology relates in part to a multiple tube device useful in part for processing biological fluids.

BACKGROUND

Several medical laboratory tests make use of patient blood samples. Patient blood often is collected in a vacuum tube (e.g., BD Vacutainer®, Beckton Dickinson) and often is processed for further analysis. Certain blood products, such as serum, are prepared by processes that include clotting patient blood. Such blood products can be separated from the clots and then analyzed in a laboratory test. A blood product sometimes is analyzed in one or more laboratory tests for clarity and/or amount of one or more components (e.g., glucose, lipids, drugs, antibodies, elements (e.g., sodium, potassium, chloride, iron), creatinine, urea, hormones, enzymes). A blood product sometimes is analyzed by a spectrometric assay that detects light transmitted through the product.

SUMMARY

Provided herein are fluid handling devices having multiple tubes that facilitate separation of liquid from solid present in a biological fluid. Devices provided herein often are configured for loading of a biological fluid into one tube, retaining solid in the tube in which the fluid was loaded, and draining the liquid from the fluid into a separate tube of the device.

Devices provided herein allow for analysis of the separated liquid by a spectrometric laboratory assay, and typically include a region of reduced thickness in the tube configured to receive the separated liquid. A region of reduced thickness often is configured to facilitate light transmission through the tube wall for a spectrometric assay, and often is configured to permit light transmission through a device manufactured from a semitransparent material.

Provided in certain aspects are multiple tube fluid processing devices, which include a first tube having a first tube wall, a first tube bottom, a first tube opening, a first tube exterior surface and first tube interior surface; a second tube having a second tube wall, a second tube bottom, a second tube opening, a second tube exterior surface and a second tube interior surface; and a junction between the first tube and the second tube. The junction often includes (i) a portion of the first tube exterior surface in connection with a portion of the second tube exterior surface, (ii) a portion of the first tube interior surface in connection with a portion of the second tube interior surface, and/or (iii) a portion of the first tube wall in connection with a portion of the second tube wall. The junction also often includes a junction opening between the first tube interior surface and the second tube interior surface. The first tube wall typically includes a region of reduced wall thickness, and the first tube and the second tube generally comprise a polymer. A multiple tube device sometimes is manufactured from a polymer having a haze factor between about 6 to about 9 (e.g., a haze factor of about 7 or about 8), or about 20% or better (e.g., about 15% or better, about 12% or better, about 11% or better, about 10% or better, about 9% or better, about 8% or better, or about 5% or better). A multiple tube device sometimes is manufactured from a polymer having a melt flow rate of about 24 grams per ten minutes (g/10 min) or greater. A region of reduced thickness in a multiple tube device often includes one or more thickness steps, and/or sometimes has an average, mean, median or maximum thickness of about 0.035 inches (e.g., average, mean, median or maximum thickness of about 0.015 inches to about 0.030 inches). The wall of the first tube often is longer than the wall of the second tube, and the second tube bottom often terminates at the first tube wall at, or in proximity to (e.g., about 0.001 inches to about 0.1 inches), the distal terminus of the junction between the first tube and the second tube. A region of reduced thickness sometimes is located distal to the junction between the second tube bottom and the first tube wall. In some embodiments, a region of reduced thickness is defined in part by two perimeters: (i) a proximal circumferentially-disposed thickness step and (ii) a distal circumferentially-disposed terminus.

Also provided in certain aspects are methods for processing a biological fluid, which include loading a biological fluid into the second tube of a multiple tube device described herein, which biological fluid comprises a liquid and a solid, under conditions in which the liquid transmits through the junction opening, or portion thereof, into the first tube, and the solid, or portion thereof, is retained or substantially retained in the second tube. Such methods often include transmitting light through one or more regions of reduced thickness of the device after liquid from the biological fluid has transmitted to the first tube.

Provided also in certain aspects are molds that include surfaces configured to manufacture a multiple tube device described herein by an injection molding process. Also provided in certain aspects are methods for manufacturing a device described herein, which can include injecting a moldable polymer into a mold configured to manufacture a multiple tube device described herein, and removing the device from the mold after the polymer has hardened or substantially hardened.

Certain aspects and embodiments are described further in the following description, examples, claims and drawings.

BRIEF DESCRIPTION OF THE DRAWINGS

The drawings illustrate embodiments of the technology and are not limiting. For clarity and ease of illustration, the drawings are not made to scale and, in some instances, various aspects may be shown exaggerated or enlarged to facilitate an understanding of particular embodiments.

FIG. 7 is a cross-sectional view thereof through section A-A of FIG. 5; FIG. 9A is a cross-sectional view thereof through section B-B of FIG. 4; FIG. 8 is an enlarged view of the region encircled in FIG. 7.

FIG. 16 is a cross-sectional view thereof through section A-A of FIG. 14; FIG. 18 is a cross-sectional view thereof through section B-B of FIG. 13; and FIG. 17 is an enlarged view of the region encircled in FIG. 16.

Figure 1:
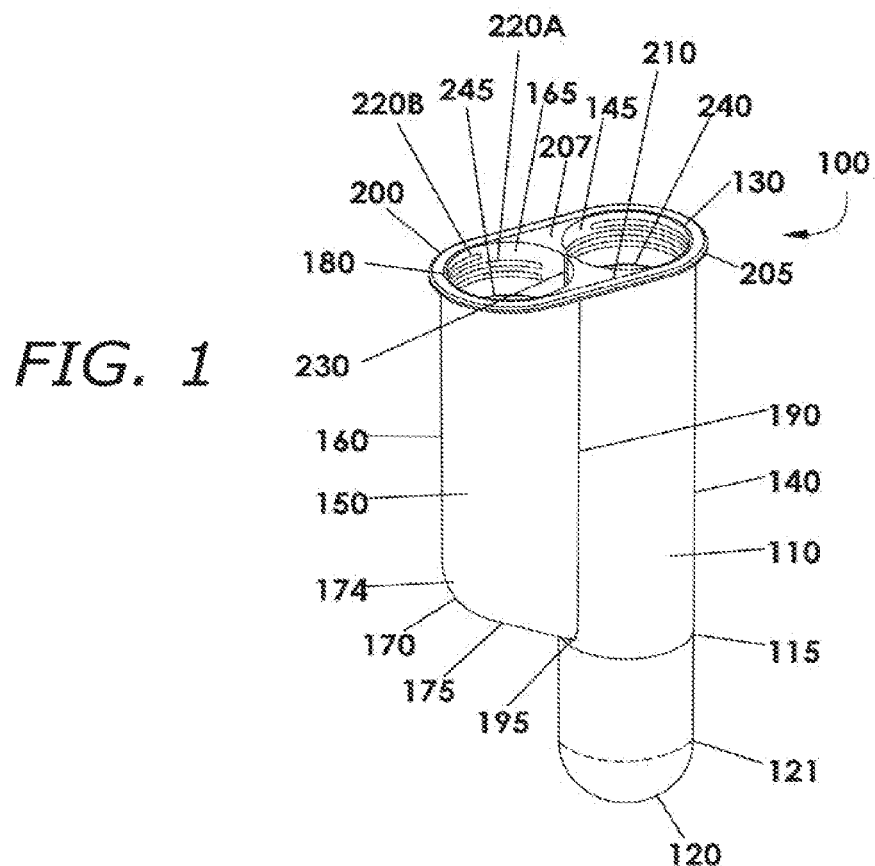
FIG. 1 is a top perspective view (i.e., proximal portion perspective view) of a multiple tube device embodiment comprising a region of reduced thickness distal of the junction between the second tube bottom and the first tube wall.

Certain features in the drawings are summarized in the table hereafter.

| Callout | Element |
|---|---|
| 100 | multiple tube fluid processing device embodiment |
| 110 | first tube |
| 112 | first tube wall |
| 115 | circumferentially-disposed distal first tube wall thickness step |
| 120 | first tube bottom |
| 121 | first tube wall and first tube bottom junction |
| 130 | first tube opening |
| 140 | first tube exterior surface |
| 145 | first tube interior surface |
| 147 | first tube interior |
| 150 | second tube |
| 152 | second tube wall |
| 160 | second tube exterior surface |
| 165 | second tube interior surface |
| 167 | second tube interior |
| 170 | second tube bottom |
| 171 | portion of second tube bottom that opposes portion of second tube bottom at junction 195 with the first tube wall |
| 174 | substantially spherical portion of second tube bottom |
| 175 | substantially conical portion of second tube bottom |
| 178 | sloped surface of second tube bottom |
| 180 | second tube opening |
| 190 | junction between first tube and second tube |
| 191 | second tube bottom sidewall exterior surface |
| 192 | first tube interior surface at junction opening |
| 193 | second tube interior surface at junction opening |
| 194 | second tube junction interface with first tube (junction interface is hatched) |
| 195 | junction between second tube bottom and first tube |
| 196 | wall thickness at proximal junction opening |
| 197 | wall thickness at distal junction opening |
| 200 | flange |
| 205 | flange edge |
| 207 | proximal flange surface |
| 208 | distal flange surface |
| 209 | relieved surface in distal flange surface |
| 210 | optional thickness step |
| 212 | proximal flange surface adjacent to thickness step 210 |
| 220A | interior annular rib |
| 220B | interior annular rib |
| 230 | junction opening |
| 231 | proximal junction opening terminus |
| 232 | distal junction opening terminus |
| 240 | circumferentially-disposed proximal first tube wall thickness step |
| 245 | circumferentially-disposed proximal second tube wall thickness step |
| 250 | distal interior annular rib |
| 255 | region of reduced wall thickness |
| 257 | circumferentially-disposed distal terminus of region of reduced wall thickness |
| 260 | tube axis |
| 300 | multiple tube fluid processing device embodiment |
| 310 | first tube |
| 312 | first tube wall |
| 315 | circumferentially-disposed first tube wall thickness step |
| 320 | first tube bottom |
| 330 | first tube opening |
| 340 | first tube exterior surface |
| 345 | first tube interior surface |
| 350 | second tube |
| 352 | second tube wall |
| 360 | second tube exterior surface |
| 365 | second tube interior surface |
| 370 | second tube bottom |
| 380 | second tube opening |
| 390 | junction between the first tube and second tube |
| 395 | junction between second tube bottom and first tube |
| 397 | wall thickness at junction opening |
| 400 | flange |
| 405 | flange edge |
| 407 | proximal flange surface |
| 408 | distal flange surface |

-continued

| Callout | Element |
|---|---|
| 410 | flange bevel |
| 420A | interior annular rib |
| 420B | interior annular rib |
| 430 | junction opening |
| 448 | first tube wall thickness proximal to first tube wall thickness step |
| 449 | first tube wall thickness distal to first tube wall thickness step |
| 460 | tube axis |
| 500 | multiple tube fluid processing device embodiment |
| 510 | first tube |
| 512 | first tube wall |
| 520 | first tube bottom |
| 530 | first tube opening |
| 540 | first tube exterior surface |
| 545 | first tube interior surface |
| 550 | second tube |
| 552 | second tube wall |
| 560 | second tube exterior surface |
| 565 | second tube interior surface |
| 570 | second tube bottom |
| 580 | second tube opening |
| 590 | junction between the first tube and second tube |
| 595 | junction between second tube bottom and first tube |
| 597 | junction wall edge at junction opening |
| 600 | flange |
| 605 | flange edge |
| 607 | proximal flange surface |
| 608 | distal flange surface |
| 610 | flange bevel |
| 620A | interior annular rib |
| 620B | interior annular rib |
| 630 | junction opening |
| 641 | axially-disposed first tube wall thickness step (641A and 641B) |
| 642 | thicker first tube wall thickness adjacent to axially-disposed first tube wall thickness step 641 |
| 643 | thinner first tube wall thickness adjacent to axially-disposed first tube wall thickness step 641 |
| 647 | circumferentially-disposed first tube wall thickness step |
| 648 | first tube wall thickness proximal to circumferentially-disposed first tube wall thickness step 647 |
| 649 | first tube wall thickness distal to circumferentially-disposed first tube wall thickness step 647 |
| 660 | tube axis |
| 670 | region of reduced wall thickness |
| 700 | multiple tube fluid processing device embodiment |
| 710 | first tube |
| 712 | first tube wall |
| 720 | first tube bottom |
| 730 | first tube opening |
| 740 | first tube exterior surface |
| 745 | first tube interior surface |
| 750 | second tube |
| 752 | second tube wall |
| 760 | second tube exterior surface |
| 765 | second tube interior surface |
| 770 | second tube bottom |
| 780 | second tube opening |
| 790 | junction between the first tube and second tube |
| 795 | junction between second tube bottom and first tube |
| 797 | junction wall edge at junction opening |
| 800 | flange |
| 805 | flange edge |
| 807 | proximal flange surface |
| 808 | distal flange surface |
| 810 | flange bevel |
| 820A | interior annular rib |
| 820B | interior annular rib |
| 830 | junction opening |
| 841 | substantially axially-disposed first tube wall thickness steps (841A and 841B) |
| 842 | thicker first tube wall thickness adjacent to axially-disposed first tube wall thickness step 841 |
| 843 | thinner first tube wall thickness adjacent to axially-disposed first tube wall thickness step 841 |
| 847 | proximal circumferentially-disposed first tube wall thickness step |
| 848 | first tube wall thickness proximal to proximal circumferentially-disposed first tube wall thickness step 847 |
| 849, 850 | first tube wall thickness distal to proximal circumferentially-disposed first tube wall thickness step 847 |
| 851 | distal circumferentially-disposed first tube wall thickness step |
| 852 | first tube wall thickness proximal to distal circumferentially-disposed first tube wall thickness step 851 |
| 853 | first tube wall thickness distal to distal circumferentially-disposed first tube wall thickness step 851 |
| 860 | tube axis |
| 870 | region of reduced wall thickness |
| 900 | multiple tube fluid processing device embodiment |
| 910 | first tube |
| 930 | first tube opening |
| 950 | second tube |
| 980 | second tube opening |
| 990 | junction between the first tube and second tube |
| 995 | junction between second tube bottom and first tube |
| 997 | junction wall edge at junction opening |
| 998A | modified surface region of the interior wall of the junction between the second and first tube |
| 998B | modified surface region of the interior wall of the junction between the second and first tube |
| 998C | modified surface region of second tube interior surface |
| 998D | modified surface region of second tube interior surface |
| 998E | modified surface region of the junction between the second tube bottom and the first tube |
| 999 | modified surface region of first tube interior surface |
| 1000 | flange |
| 1030 | junction opening |
| 1060 | tube axis |

DETAILED DESCRIPTION

Fluid handling devices described herein are useful for separating liquid from solid in a biological fluid such as blood, for example. Devices described herein also are useful for analyzing the separated liquid by a laboratory spectrometric assay, and generally include a region of reduced thickness in the tube configured to receive the separated liquid. A region of reduced thickness facilitates light transmission through the tube wall for a spectrometric assay, and permits relatively efficient light transmission through devices manufactured from a semitransparent substance.

Multiple Tube Fluid Handling Devices

Figure 31:
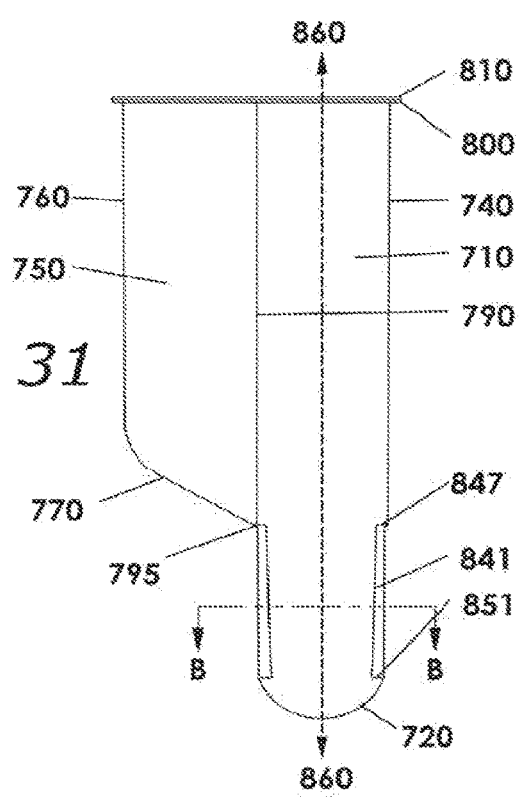
FIG. 31 is a side view thereof.

A fluid handling device often includes a region of reduced wall thickness, which can be located in or on one or more tubes of the device (e.g., located in or on the first tube). A fluid handling device sometimes includes one region of reduced wall thickness, sometimes two regions of reduced wall thickness, sometimes three regions of reduced wall thickness, sometimes four regions of reduced wall thickness, and sometimes five or more regions of reduced wall thickness. In some embodiments, a tube of a fluid handling device comprises two regions of reduced wall thickness located on opposing sides of the tube (e.g., FIG. 31). A region of reduced wall thickness sometimes is located on a front, side or back of a tube in a fluid handling device. A region of reduced wall thickness is not the same as a junction opening located in a junction between the first tube and the second tube (e.g., junction opening 230, 830). A region of reduced wall thickness may include part of all of a junction opening, and sometimes is located in a region of a tube that does not include the junction opening or portion thereof.

A multiple tube fluid handling device generally includes a region not of reduced wall thickness that abuts a region of reduced wall thickness. A region of reduced wall thickness often is bounded by, or comprises, a thickness step that transitions from a region not having reduced wall thickness to the region of reduced wall thickness. A wall thickness step often is defined by a transition from a region not having a reduced wall thickness to a region of reduced wall thickness. A region of reduced wall thickness sometimes is bounded by, or comprises, one thickness step, two thickness steps, three thickness steps, four thickness steps or five or more thickness steps. A wall thickness step sometimes is on an interior tube surface or an exterior tube surface, or on an interior tube surface and an exterior tube surface, in or at a region of reduced wall thickness. A transition in or at a wall thickness step can be of any suitable geometry, non-limiting examples of which include perpendicular (i.e., 90 degrees), substantially perpendicular (e.g., about 90 degrees; about 88 degrees to about 92 degrees; about 80 degrees to about 89 degrees; about 91 degrees to about 100 degrees), beveled, angled (e.g., defined by a draft angle) and curved. A curved transition sometimes comprises a concave curved surface and/or convex curved surface relative to the tube wall surface on which the region of reduced wall thickness is located, and sometimes comprises a compound curve comprising two or more curved surfaces.

Figure 4:
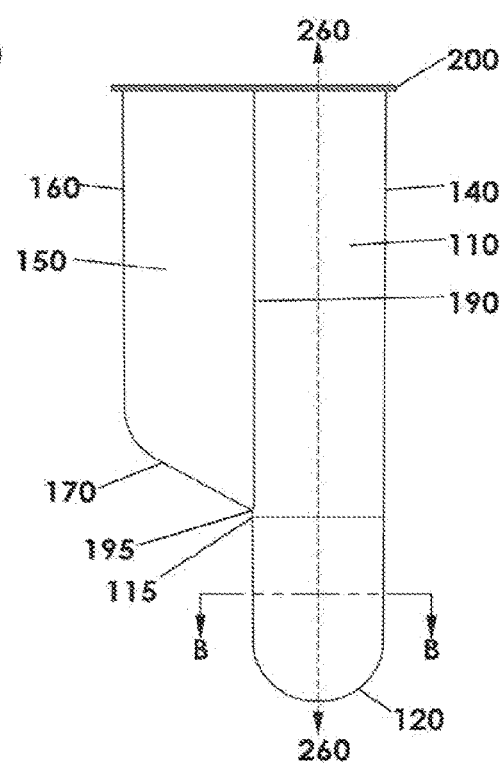
FIG. 4 is a side view thereof.
Figure 5A:
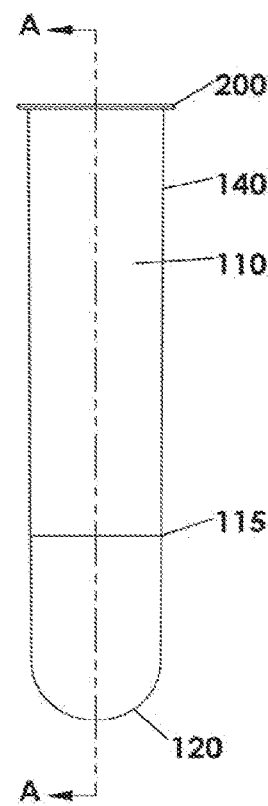
FIG. 5A is a front view thereof (i.e., first tube wall face view)
Figure 6:
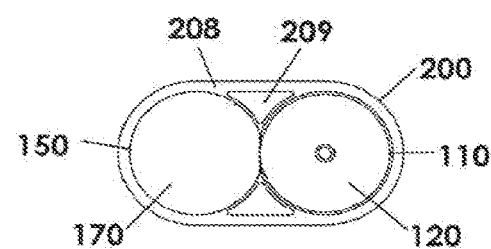
FIG. 6 is a bottom view thereof (i.e., distal portion view)
Figure 9B:
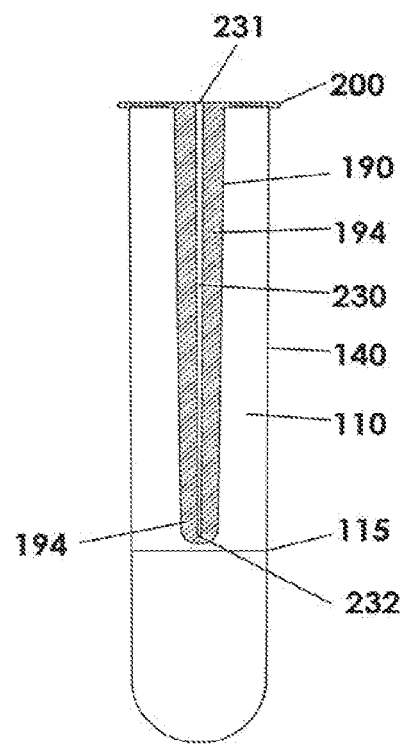
FIG. 9B is a cross-sectional view thereof through section C-C of FIG. 3.
Figure 10:
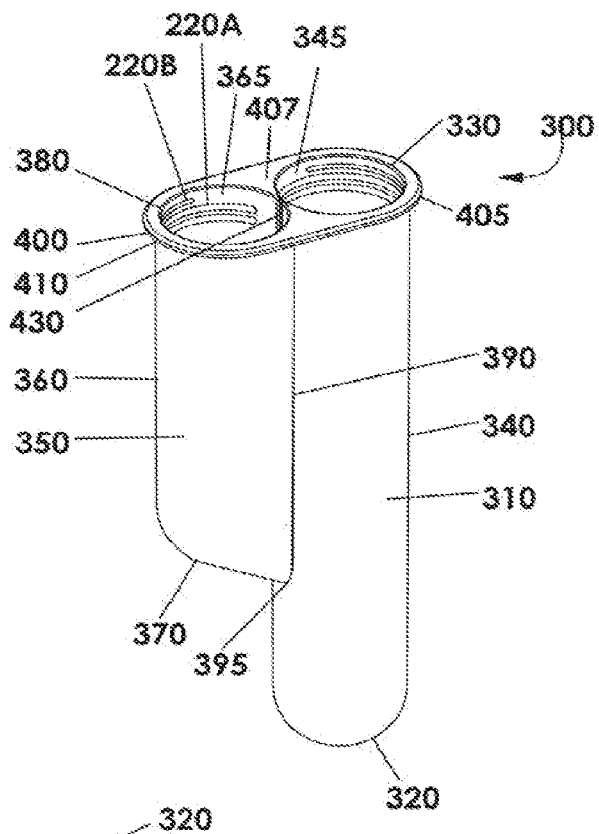
FIG. 10 is a top perspective view (i.e., proximal portion perspective view) of a multiple tube device that does not have a region of reduced thickness distal of the junction between the second tube bottom and the first tube wall.
Figure 11:
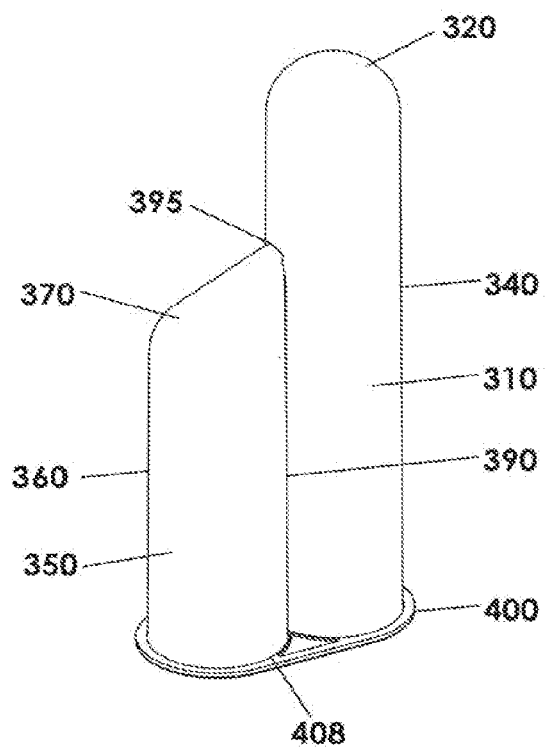
FIG. 11 is a bottom perspective view (i.e., distal portion perspective view) thereof.
Figure 12:
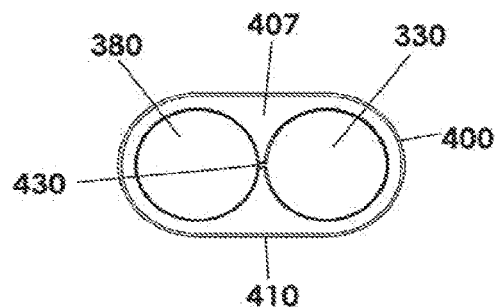
FIG. 12 is a top view (i.e., proximal portion view) thereof.
Figure 13:
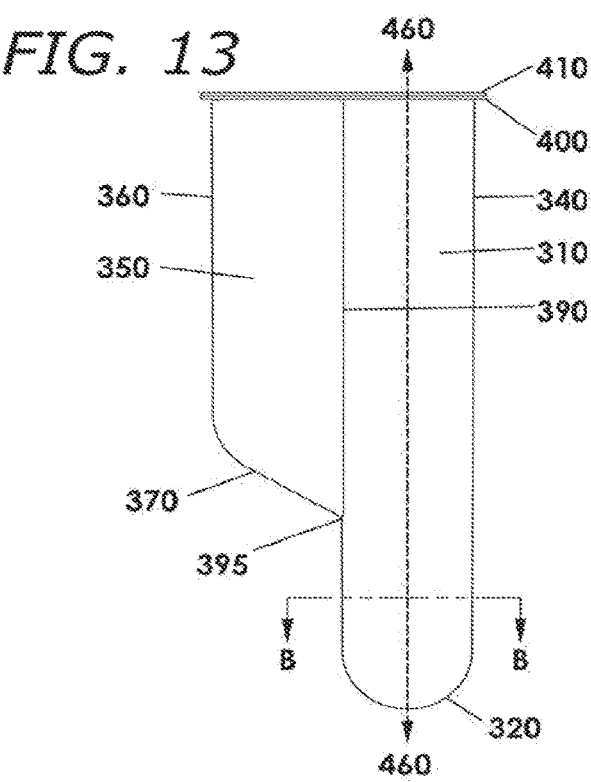
FIG. 13 is a side view thereof.
Figure 14:
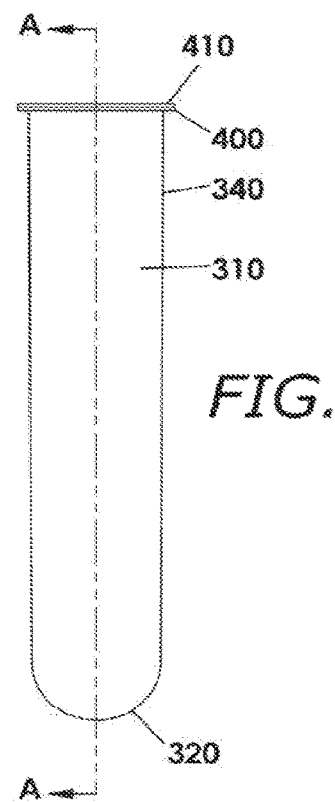
FIG. 14 is a front view thereof.
Figure 15:
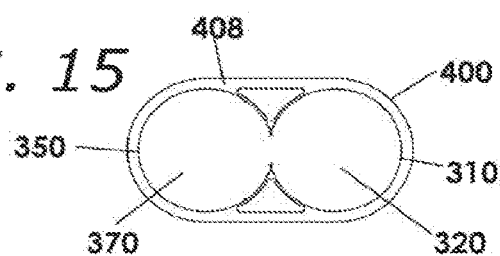
FIG. 15 is a bottom view (i.e., distal portion view) thereof.
Figure 19:
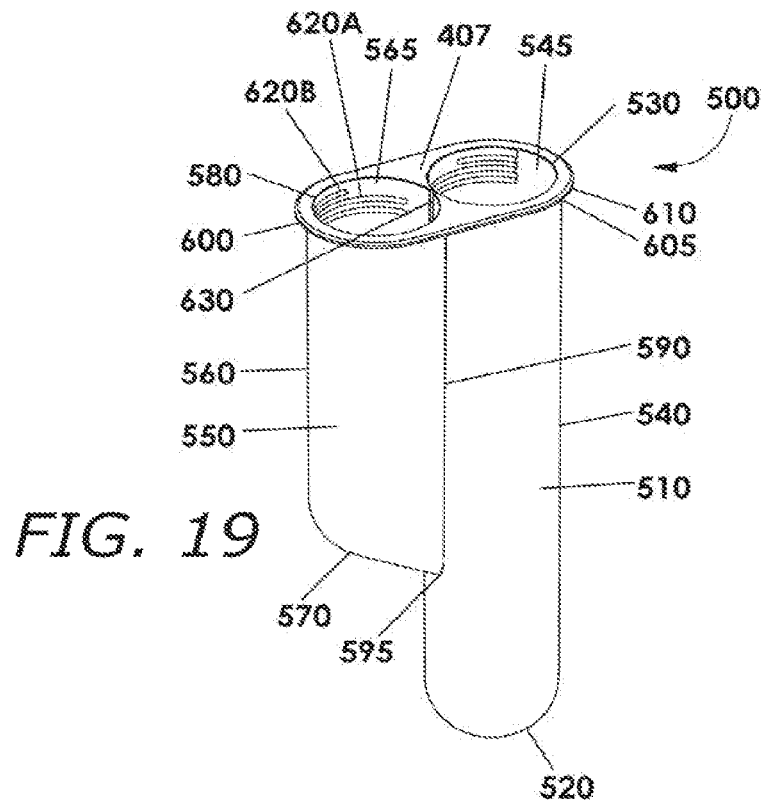
FIG. 19 is a top perspective view (i.e., proximal portion perspective view) of a multiple tube device embodiment comprising two regions of reduced thickness.
Figure 20:
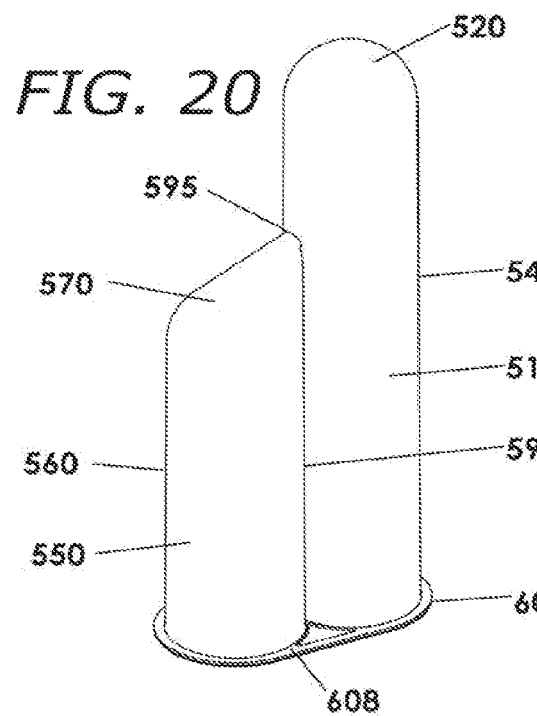
FIG. 20 is a bottom perspective view (i.e., distal portion perspective view) thereof.

Wall thickness in a region of reduced wall thickness sometimes is uniform or substantially uniform (e.g., a thickness variance of about 5% or less (e.g., a thickness variance of about 4% or less, 3% or less, 2% or less, 1% or less, 0.5% or less, 0.1% or less)). Wall thickness in a region of reduced wall thickness sometimes is not tapered or flared (e.g., not continuously tapered, not continuously flared). Wall thickness in a region of reduced wall thickness sometimes is not uniform, and sometimes is tapered or flared (e.g., continuously tapered, continuously flared). A wall surface in a region of reduced thickness sometimes is drafted and sometimes is not drafted. A wall surface in a region not of reduced thickness sometimes is drafted and sometimes is not drafted. A wall surface of a first tube wall, or portion thereof, sometimes is drafted and sometimes is not drafted. A wall surface of a second tube wall, or portion thereof, sometimes is drafted and sometimes is not drafted. An interior surface or an exterior surface, or an interior surface and an exterior surface of a wall or portion thereof can include a draft, which draft sometimes is about 0.001 degrees to about 10 degrees from vertical, and sometimes is about 0.01, 0.1, 0.2, 0.3, 0.4, 0.5, 0.6, 0.7, 0.8, 0.9, 1, 2, 3, 4, 5, 6, 7, 8 or 9 degrees from vertical. "Vertical" as pertaining to a draft is parallel to a vertical axis (e.g., 260 in FIG. 4)) and is characterized as having no draft.

An average, mean, median, minimum or maximum wall thickness of a region of reduced wall thickness sometimes is at least about 0.005 inches less than the wall thickness of an adjacent region not of reduced wall thickness (e.g., at least about 0.006 inches less, at least about 0.008 inches less, at least about 0.010 inches less, at least about 0.012 inches less, at least about 0.014 inches less, at least about 0.016 inches less, at least about 0.018 inches less, or at least about 0.020 inches less, than the wall thickness of an adjacent region not of reduced wall thickness). An average, mean, median, minimum or maximum wall thickness of a region of reduced wall thickness sometimes is at most about 0.005 inches less than the wall thickness of an adjacent region not of reduced wall thickness (e.g., about 0.004 inches less than, about 0.003 inches less than, about 0.002 inches less than or about 0.001 inches less than, the wall thickness of an adjacent region not of reduced wall thickness).

An average, mean, median, minimum or maximum wall thickness of a region of reduced thickness sometimes is about 0.035 inches or less (e.g., about 0.034 inches or less, about 0.033 inches or less, about 0.032 inches or less, about 0.031 inches or less, about 0.030 inches or less, about 0.029 inches or less, about 0.028 inches or less, about 0.027 inches or less, about 0.026 inches or less, about 0.025 inches or less, about 0.024 inches or less, about 0.023 inches or less, about 0.022 inches or less, about 0.021 inches or less, about 0.020 inches or less, about 0.019 inches or less, about 0.018 inches or less, about 0.017 inches or less, about 0.016 inches or less, about 0.015 inches or less or about 0.014 inches or less). An average, mean, median, minimum or maximum wall thickness of a region of reduced thickness sometimes is about 0.015 inches to about 0.032 inches (e.g., about 0.016 inches, 0.017 inches, 0.018 inches, 0.019 inches, 0.020 inches, 0.021 inches, 0.022 inches, 0.023 inches, 0.024 inches, 0.025 inches, 0.026 inches, 0.027 inches, 0.028 inches, 0.029 inches, 0.030 inches, 0.031 inches). An average, mean, median, minimum or maximum wall thickness of a region not of reduced wall thickness sometimes is 0.024 inches or greater, or about 0.024 inches to about 0.045 inches (e.g., about 0.025 inches, 0.026 inches, 0.027 inches, 0.028 inches, 0.029 inches, 0.030 inches, 0.031 inches, 0.032 inches, 0.033 inches, 0.034 inches, 0.035 inches, 0.036 inches, 0.037 inches, 0.038 inches, 0.039 inches, 0.040 inches, 0.041 inches, 0.042 inches, 0.043 inches, 0.044 inches or greater).

A region of reduced wall thickness sometimes is configured as a panel or window defined by one or more thickness steps. A region of reduced wall thickness configured as a panel or window can be of any suitable geometry, non-limiting examples of which include multilateral (e.g., triangle, pentagon, hexagon, heptagon, octagon), substantially multilateral (e.g., substantially triangle, substantially pentagon, substantially hexagon, substantially heptagon, substantially octagon), quadrilateral (e.g., square, rectangle, rhombus, parallelogram, trapezoid), substantially quadrilateral (e.g., substantially square, substantially square, substantially rectangular, substantially rhomboid, substantially parallelogram, substantially trapezoid), circular, substantially circular, oval, substantially oval and the like. A region of reduced thickness configured as a panel or window sometimes comprises a curved surface, which curved surface often has a radius of curvature the same as, or substantially the same as, the radius of curvature of the tube wall on which the region of reduced thickness resides. The thickness of a region of reduced thickness configured as a panel or window sometimes is uniform or substantially uniform (e.g., a thickness variance of about 5% or less (e.g., a thickness variance of about 4% or less, 3% or less, 2% or less, 1% or less, 0.5% or less, 0.1% or less)).

A region of reduced wall thickness sometimes comprises, or is bounded by, (i) a circumferentially-disposed thickness step (e.g., comprises or is bounded by one, two, three, four or more circumferentially-disposed thickness steps), (ii) an axially-disposed thickness step (e.g., comprises or is bounded by one, two, three, four or more axially-disposed thickness steps), (iii) no circumferentially-disposed thickness step, (iv) no axially-disposed thickness step, or (v) a combination of the foregoing. An axially-disposed thickness step generally is parallel to a tube axis, and sometimes a thickness step in or on a tube is substantially axially-disposed (e.g., about a 0.01 degree to about a 10 degree deviation from parallel to a tube axis). A tube axis (e.g., 260, 860) generally is perpendicular to the surface defined by a proximal tube opening (e.g., 130, 730), and for tubes having a vertical, non-drafted wall surface, a tube axis generally parallel to such a vertical, non-drafted wall surface. The length of an axially-disposed thickness step often is a portion of the tube length on which the region of reduced thickness is disposed, and sometimes is equal to the tube length on which the region of reduced thickness is disposed. A circumferentially-disposed thickness step generally is perpendicular to a tube axis, and sometimes a thickness step in or on a tube is substantially circumferentially-disposed (e.g., about a 0.01 degree to about a 10 degree deviation from perpendicular to a tube axis). A circumferentially-disposed thickness step sometimes traverses the entire circumference of a tube, and sometimes traverses a portion of a tube circumference.

All or part of a region of reduced wall thickness often is disposed in a distal region of the first tube. All or part of a region of reduced wall thickness often is disposed distal to the distal terminus of the junction between the first tube and the second tube (e.g., 195). In certain embodiments, the proximal perimeter of a region of reduced wall thickness is defined by a circumferentially-disposed thickness step that spans the entire circumference of the first tube, and the region of reduced wall thickness is distal to the thickness step. In such embodiments, the region of reduced wall thickness (e.g., 255) encircles a distal portion of the first tube and the first tube wall in that distal portion is the region of reduced wall thickness. In some embodiments, the region of reduced wall thickness (e.g., 255) is in part defined by a wall length of about 1.0 inch or less (e.g., about 0.1 inches, 0.2 inches, 0.3 inches, 0.4 inches, 0.5 inches, 0.6 inches, 0.7 inches, 0.8 inches, 0.9 inches) or about 0.625 inches to about 0.875 inches. In some embodiments, the circumferentially-disposed thickness step is located on the interior surface of the first wall or on the exterior surface of the first wall (e.g., 115), or the exterior surface and the interior surface of the first tube wall each contain such a thickness step. In some embodiments, a region of reduced wall thickness is bounded by a circumferentially-disposed thickness step (e.g., 115) and a circumferentially-disposed terminus (e.g., 257), which circumferentially-disposed terminus sometimes is a circumferentially disposed thickness step, and sometimes is a point at which the wall thickness flares towards the first tube bottom and gradually thickens. In certain embodiments, the region of reduced wall thickness has a uniform or substantially uniform wall thickness, which thickness is about 0.020 inches to about 0.032 inches (e.g., a thickness of about 0.021 inches, 0.022 inches, 0.023 inches, 0.024 inches, 0.025 inches, 0.026 inches, 0.027 inches, 0.028 inches, 0.029 inches, 0.030 inches, 0.031 inches). In certain embodiments, a region not of reduced wall thickness adjacent to the region of reduced wall thickness is greater than about 0.031 inches, and sometimes is about 0.032 inches to about 0.042 inches (e.g., a thickness of about 0.033 inches, 0.034 inches, 0.035 inches, 0.036 inches, 0.037 inches, 0.038 inches, 0.039 inches, 0.040 inches, 0.041 inches). In a region not of reduced thickness (e.g., a region proximal to thickness step 115), the first tube wall thickness sometimes flares towards the proximal portion of the tube to a maximum thickness of about 0.035 inches or greater (e.g., about 0.040 inches to about 0.042 inches). In a region not of reduced thickness (e.g., a region proximal to thickness step 115), both wall surfaces of the first tube (i.e., the exterior surface and the interior surface) sometimes are not drafted, sometimes one wall surface is drafted but the other wall surface is not drafted, and sometimes both wall surfaces are drafted with the same draft angle or a different draft angle. In a region of reduced thickness (e.g., a region distal to thickness step 115), both wall surfaces of the first tube (i.e., the exterior surface and the interior surface) sometimes are not drafted, sometimes one wall surface is drafted but the other wall surface is not drafted, and sometimes both wall surfaces are drafted with the same draft angle or a different draft angle.

In certain embodiments, a fluid handling device comprises a proximal circumferentially-disposed thickness step (e.g., 240 and 245 in FIG. 7, which are proximal of the distal thickness step 115), and the wall thickness proximal to such a thickness step is less than the wall thickness distal to the thickness step.

Figure 21:
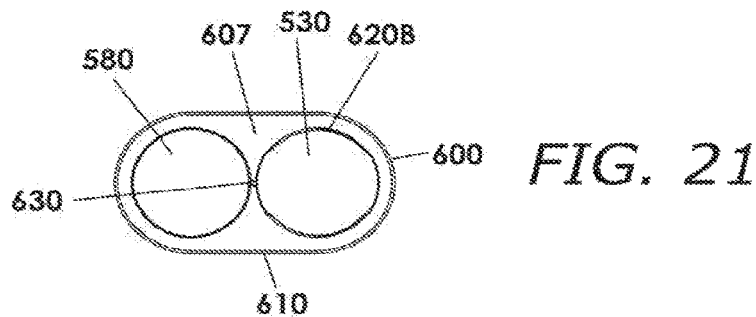
FIG. 21 is a top view (i.e., proximal portion view) thereof.
Figure 22:
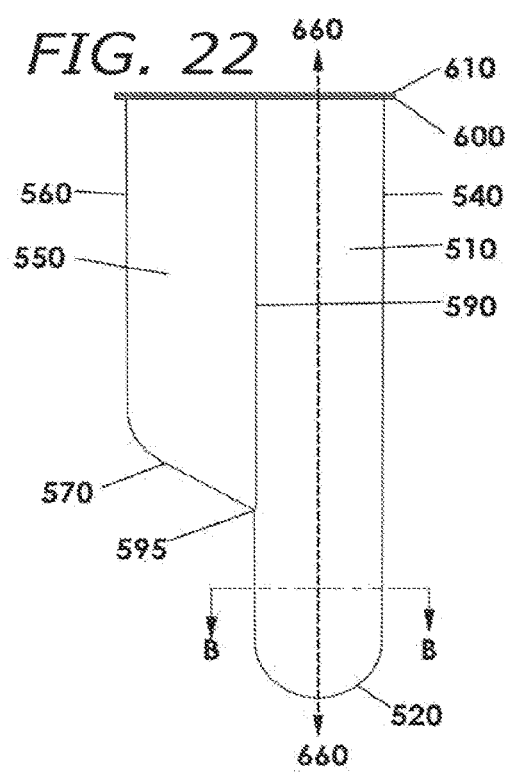
FIG. 22 is a side view thereof.
Figure 23:
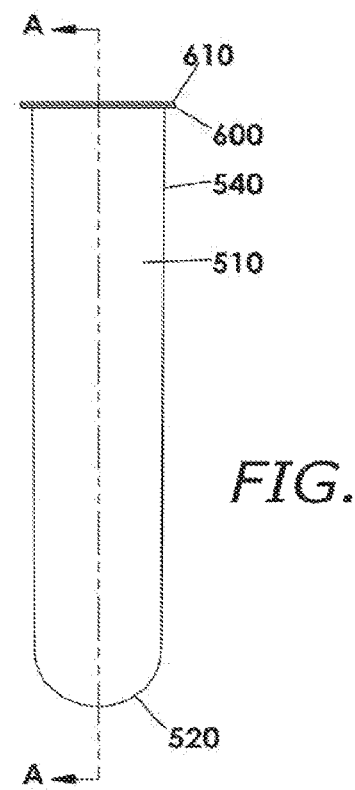
FIG. 23 is a front view thereof.
Figure 24:
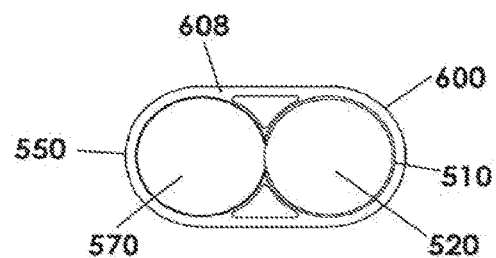
FIG. 24 is a bottom view (i.e., distal portion view) thereof.
Figure 25:
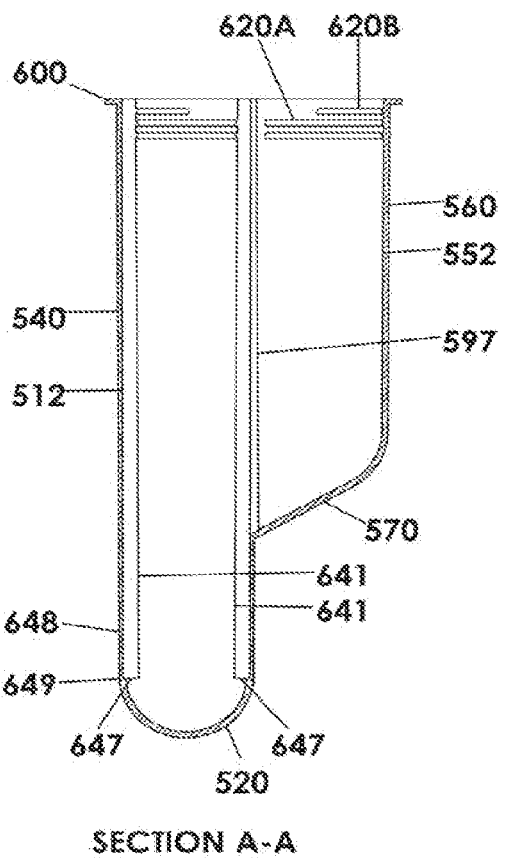
FIG. 25 is a cross-sectional view thereof through section A-A of FIG. 23.
Figure 27:
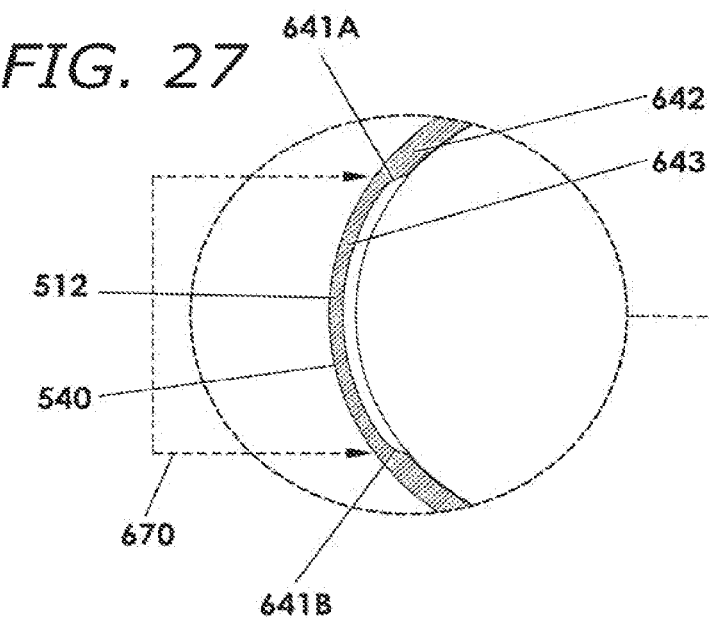
FIG. 27 is an enlarged view of the region encircled in FIG. 26.
Figure 26:
FIG. 26 is a cross-sectional view thereof through section B-B of FIG. 22.
Figure 28:
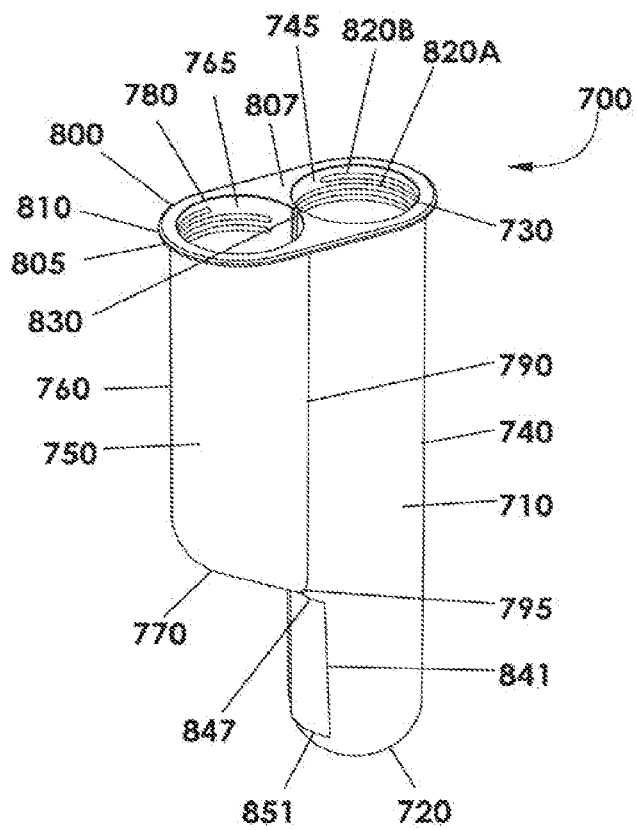
FIG. 28 is a top perspective view (i.e., proximal portion perspective view) of a multiple tube device embodiment comprising two regions of reduced thickness.
Figure 29:
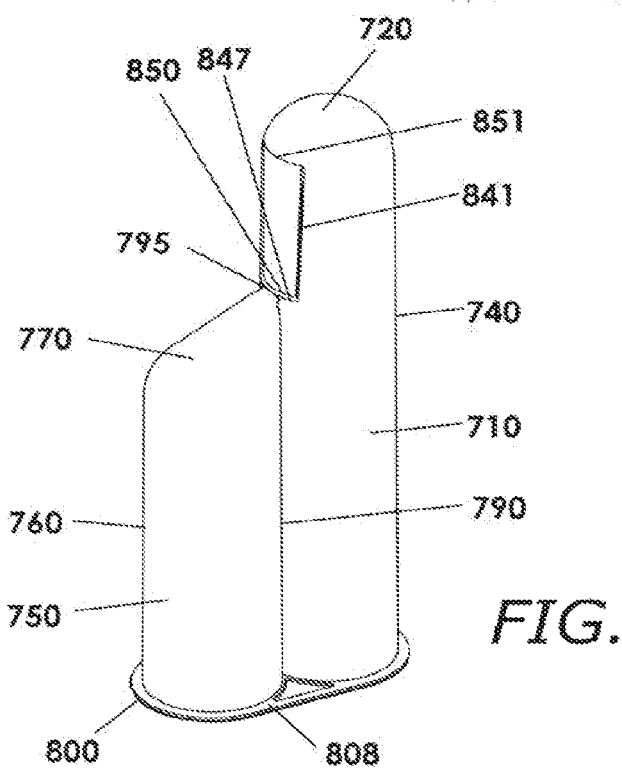
FIG. 29 is a bottom perspective view (i.e., distal portion perspective view) thereof.
Figure 30:
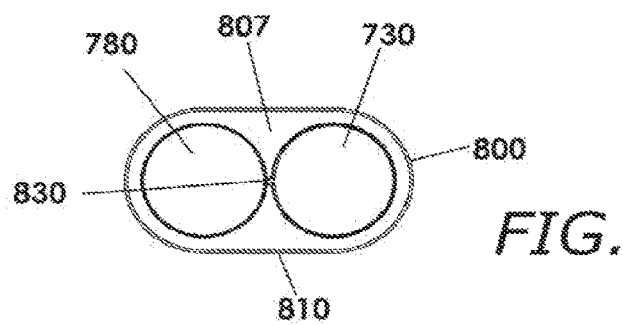
FIG. 30 is a top view (i.e., proximal portion view) thereof.

In certain embodiments, a fluid handling device comprises a region of reduced thickness configured as a panel comprising a curved surface, which panel is defined in part by a circumferentially-disposed thickness step (e.g., 647 in FIG. 25) and two axially-disposed thickness steps (e.g., 641A and 641B in FIG. 27). In certain embodiments, the fluid handling device comprises two of such panels located on opposing wall surfaces of the first tube. In certain embodiments, the thickness steps defining such panels are located in the interior wall surface of the first tube. In certain embodiments, the proximal perimeter of the panel is defined by the tube opening (e.g., 530 in FIG. 21), where the length of the axially-disposed thickness step, and the length of the panel, is about the same as the tube wall length. In certain embodiments, the thickness of the panel is uniform or is substantially uniform, and in some embodiments, the thickness of the panel is less than about 0.030 inches (e.g., 643 in FIG. 25) and the thickness of an adjacent region not of reduced thickness is greater than about 0.030 inches (e.g., 642 in FIG. 25).

Figure 32:
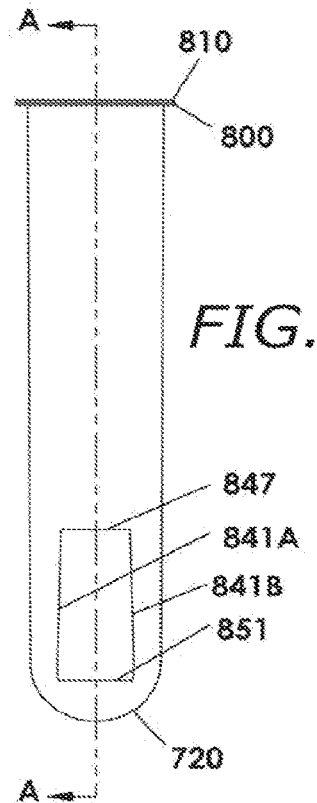
FIG. 32 is a front view thereof.
Figure 33:
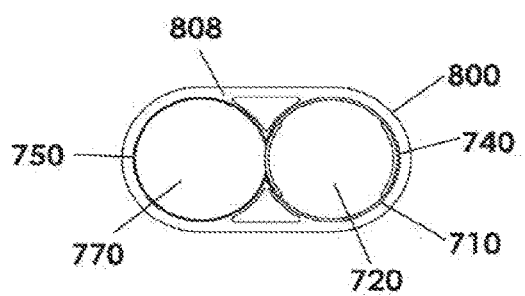
FIG. 33 is a bottom view (i.e., distal portion view) thereof.
Figure 35:
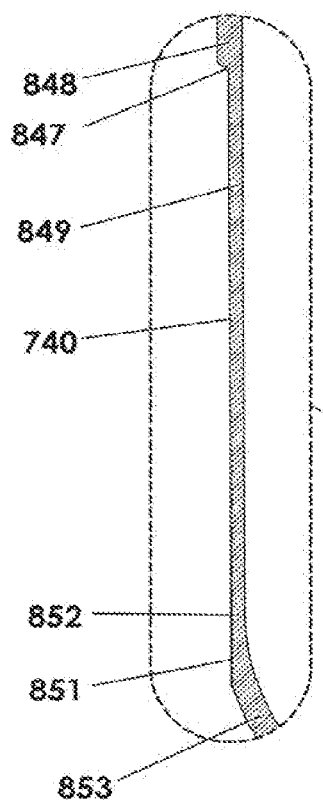
FIG. 35 is an enlarged view of the region encircled in FIG. 34.
Figure 34:
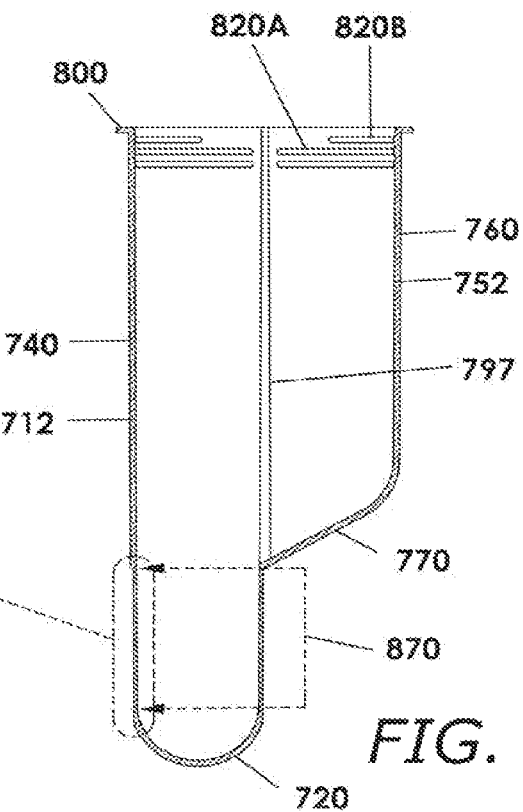
FIG. 34 is a cross-sectional view thereof through section A-A of FIG. 32.
Figure 37:
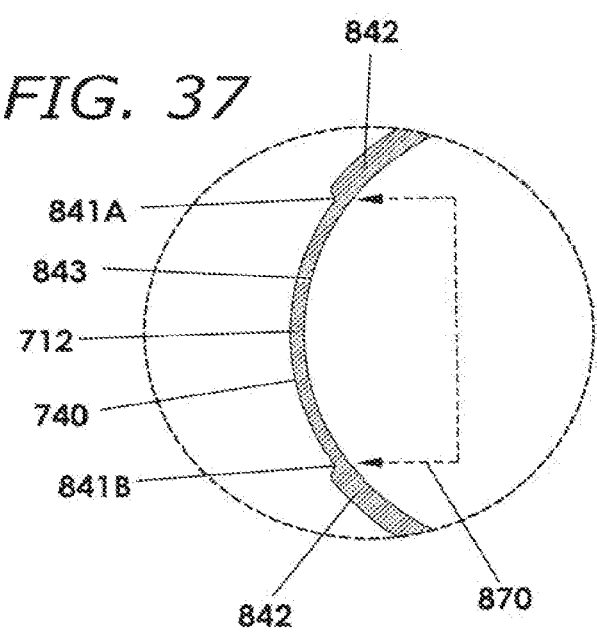
FIG. 37 is an enlarged view of the region encircled in FIG. 36.
Figure 36:
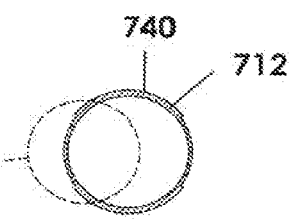
FIG. 36 is a cross-sectional view thereof through section B-B of FIG. 31.

In certain embodiments, a fluid handling device comprises a region of reduced thickness configured as a panel comprising a curved surface, which panel is defined by two circumferentially-disposed thickness step (e.g., 847 and 851 in FIG. 32) and two axially-disposed thickness steps or two substantially axially-disposed thickness steps (e.g., 841A and 841B in FIG. 32). In certain embodiments, the fluid handling device comprises two of such panels located on opposing wall surfaces of the first tube. In certain embodiments, the thickness steps defining such panels are located on the exterior wall surface of the first tube. Where two substantially axially-disposed thickness steps are present (e.g., 841A and 841B), such thickness steps sometimes are not parallel to one another. In certain embodiments, the thickness of the panel is uniform or is substantially uniform, and in some embodiments, the thickness of the panel is less than about 0.030 inches (e.g., 843, 849, 852) and the thickness of an adjacent region not of reduced thickness is greater than about 0.030 inches (e.g., 842, 848, 853). In certain embodiments, the panel is disposed in the distal region of the first tube, and sometimes is distal to the junction between the second tube bottom and the first tube (e.g., 795).

The second tube bottom of a fluid handling device often comprises a sloped surface, whereby the portion of the second tube bottom that joins with the first tube wall is distal to an opposing portion of the second tube bottom. The sloped surface often is configured as a ramp that can transmit (e.g., drain) fluid by gravity from the second tube interior to the first tube interior through the junction opening. In some embodiments, the distal exterior portion of the second tube bottom joins with the first tube wall at, or in proximity to, a distal terminus of the junction between the first tube and the second tube. In certain embodiments, second tube bottom 170 comprises a portion 171 that opposes and is proximal to another portion of the second tube bottom at junction 195 with the first tube wall. The distal surface of the second tube bottom often is rounded (e.g., second tube bottom sidewall exterior surface 191 is conical) and often comprises a sloped surface 178 that slopes from proximal portion 171 to the first tube surface at junction 195.

A junction between a tube bottom and a tube wall of a fluid handling device often is defined in whole or in part by a transition from a linear wall surface to a non-linear tube bottom (e.g., transition 121 in FIG. 1). A tube bottom of a fluid handling device sometimes comprises one structure (e.g., a spherical bottom or substantially spherical bottom). A tube bottom of a fluid handling device sometimes comprises a compound structure. The first tube bottom of a fluid handling device often is spherical or substantially spherical, and the second tube bottom sometimes is defined by a compound structure comprising a spherical portion or substantially spherical portion (e.g., 174), and a conical portion or substantially conical portion (e.g., 175).

The junction opening often is configured to permit a liquid, present in a biological fluid in the second tube interior, to transmit (e.g., drain), or substantially transmit (e.g., substantially drain), from the second tube interior (e.g., 167 in FIG. 7) to the first tube interior (e.g., 147 in FIG. 7) through the junction opening, and not permit a solid, in a biological fluid in the second tube interior, to transmit, or substantially transmit, to the first tube interior through the junction opening. In some embodiments, the biological fluid is blood, the liquid is or comprises serum, and the solid comprises one or more blood clots and sometimes blood cells. Sometimes all of the liquid from the second tube interior transmits (e.g., drains) to the first tube interior through the junction opening, and sometimes a portion of the liquid in the second tube interior is substantially transmitted to the first tube interior through the junction opening (e.g., about 60% or more of the liquid in the second tube interior transmits into the first tube interior (e.g., about 70% or more, about 75% or more, about 80% or more, about 85% or more, about 90% or more, about 95% or more of the liquid transmits through the junction opening). Often, no detectable amount of solid transmits from the second tube interior to the first tube interior through the junction opening, and sometimes a relatively small portion of the solid in the second tube interior is substantially transmitted to the first tube interior through the junction opening (e.g., about 15% or less of the solid in the second tube interior transmits into the first tube interior (e.g., about 10% or less, about 5% or less, about 4% or less, about 3% or less, about 2% or less, about 1% or less of the solid transmits through the junction opening).

In some embodiments, the junction opening (e.g., 230 in FIG. 1) is defined in part by a first tube interior surface (e.g., 192 in FIG. 7) and a second tube interior surface (e.g., 193 in FIG. 7). The junction opening often is configured as an axially-disposed slit, and one end of the slit often is disposed at the proximal terminus of the first tube and second tube and the other end of the slit is disposed at, or in proximity to, a distal portion (e.g., distal terminus) of the second tube. A junction opening sometimes has a uniform or substantially uniform width, and the width of the junction opening sometimes is about 0.014 inches to about 0.045 inches (e.g., about 0.015 inches, 0.016 inches, 0.017 inches, 0.018 inches, 0.019 inches, about 0.020 inches, about 0.021 inches, about 0.022 inches, about 0.023 inches, about 0.024 inches, about 0.025 inches, about 0.026 inches, about 0.027 inches, about 0.028 inches, about 0.029 inches, about 0.030 inches, about 0.031 inches, 0.032 inches, 0.033 inches, 0.034 inches, 0.035 inches, 0.036 inches, 0.037 inches, 0.038 inches, 0.039 inches, 0.040 inches, 0.041 inches, 0.042 inches, 0.043 inches, 0.044 inches wide). A junction opening often has a width that tapers or flares from the proximal junction opening terminus (e.g., 231) to the distal junction opening terminus (e.g., 232). For embodiments in which the junction opening tapers or flares, the width at one junction opening terminus (e.g., the proximal junction opening terminus for a junction opening that tapers from proximal to distal junction boundaries) can be about 0.030 inches to about 0.045 inches (e.g., about 0.031 inches, 0.032 inches, 0.033 inches, 0.034 inches, 0.035 inches, 0.036 inches, 0.037 inches, 0.038 inches, 0.039 inches, 0.040 inches, 0.041 inches, 0.042 inches, 0.043 inches, 0.044 inches wide) and the width at the other junction opening terminus (e.g., the distal junction opening terminus for a junction opening that tapers from proximal to distal junction boundaries) can be about 0.014 inches to about 0.020 inches (e.g., about 0.015 inches, 0.016 inches, 0.017 inches, 0.018 inches, 0.019 inches wide). A surface that in part defines a tapered or flared junction opening sometimes deviates about 0.05 degrees to about 2 degrees (e.g., a deviation of about 0.1 degrees, 0.25 degrees, 0.50 degrees, 0.75 degrees, 1 degree, 1.5 degrees) from vertical (e.g., deviation from a vertical axis (e.g., 260)).

Figure 2:
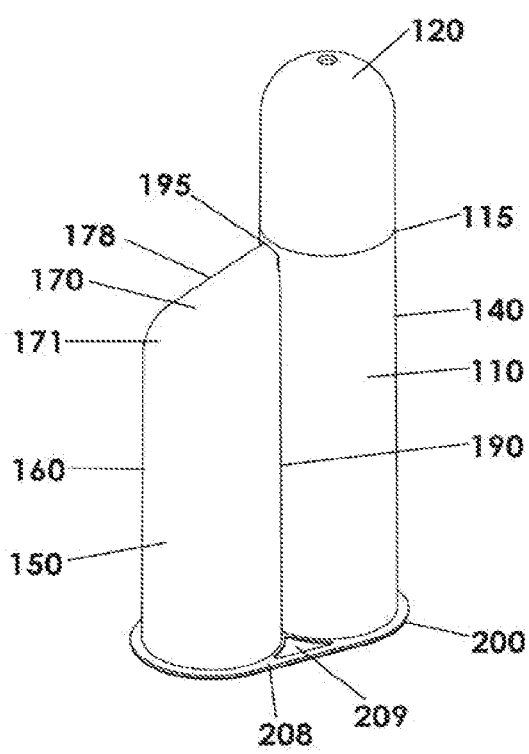
FIG. 2 is a bottom perspective view thereof (i.e., distal portion perspective view)
Figure 3:
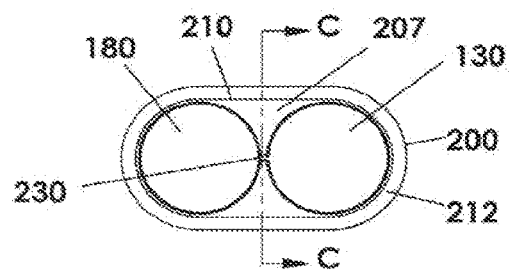
FIG. 3 is a top view thereof (i.e., proximal portion view)
Figure 5B:
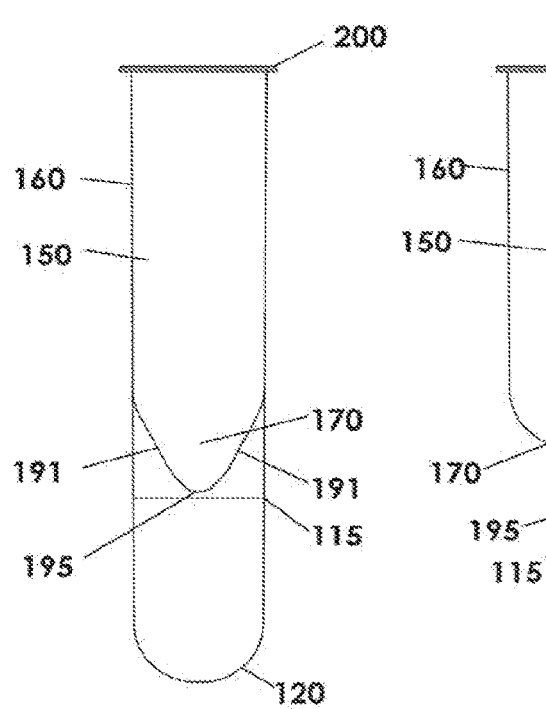
FIG. 5B is a back view thereof (i.e., second tube wall face view)

The first tube opening and the second tube opening in fluid handling devices often are coplanar (i.e., coincident, coterminous) and sometimes are staggered (i.e., not coplanar). A fluid handling device sometimes comprises a flange disposed at the proximal terminus of the device, which flange often comprises a proximal flange surface (e.g., 207 in FIG. 1) and often comprises a distal flange surface (e.g., 208 in FIG. 2). A flange surface sometimes includes one or more thickness steps (e.g., 210 on flange proximal surface; flange surface 212 is proud of relieved flange surface 207) and/or may include one or more relieved regions (e.g., relieved region 209 in flange distal surface 208).

In certain fluid handling device embodiments, the first tube wall or the second tube wall, or the first tube wall and the second tube wall, comprise an annular rib or partial annular rib disposed on a surface of the wall, which partial annular rib traverses a portion of the wall circumference (e.g., 220A, 220B). Such ribs or partial annular ribs often are disposed on the interior surface of the tube, and often are disposed at the proximal region of the tube near the tube opening. In some embodiments, a first tube includes on or in the interior surface an annular rib (e.g., 250), an annular groove, a thickness step, or combination thereof, at or near the junction of the first tube wall and the second tube bottom (e.g., 195).

Figure 38:
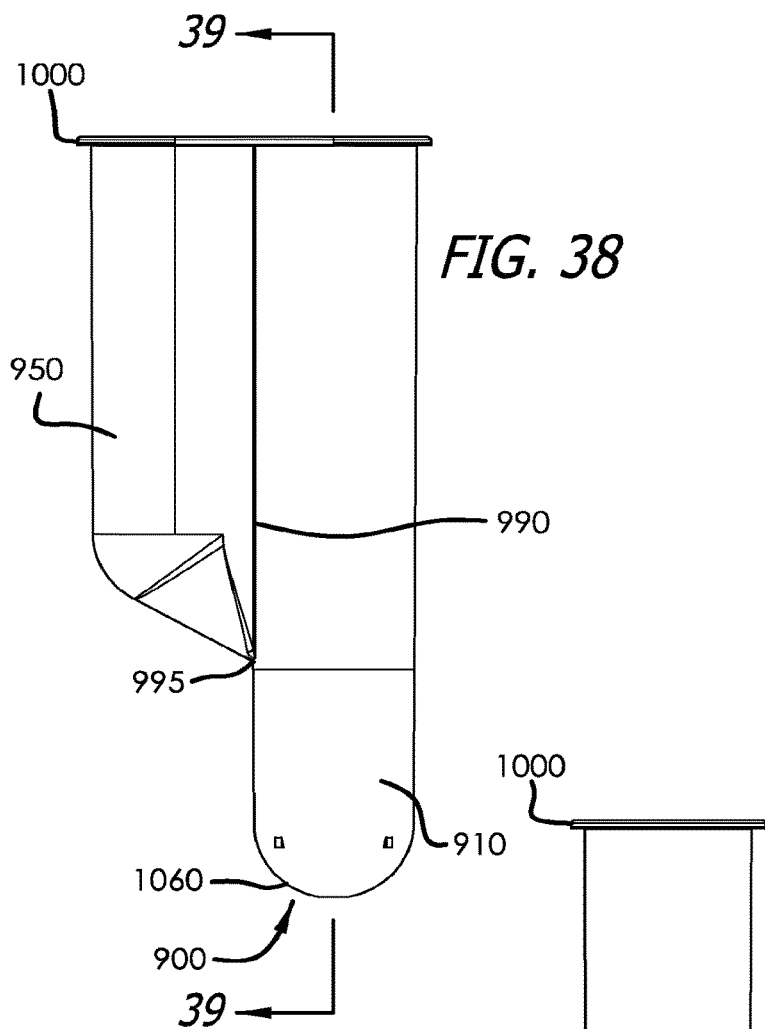
FIG. 38 is a side view of a multiple tube device embodiment comprising two regions of reduced thickness.

It has been found that fluid transfer from the second tube to the first tube is improved by including a modified region on the interior surface at the transition between the second tube and the first tube. While not wishing to be held by theory, it is believed that a modified region of the surface at the transition region between the second tube and the first tube reduces surface tension of a fluid to allow enhanced fluid transfer from the second tube to the first tube. Consequently, in some embodiments, the interior surface of the transition region between the second tube and the first tube includes a modified region configured to enhance fluid transfer (e.g., wick fluid) from the second tube to the first tube. As used herein, "transition region" refers to the junction or shared area between the second tube and the first tube and can include areas adjacent to the junction. For example, the transition region can include the shared wall at the opening between the second tube and the first tube (e.g. 990 in FIG. 38). The transition region can include the shared wall at the opening between the second tube and the first tube and a portion of the wall of the second tube. The transition region can include the shared wall at the opening between the second tube and the first tube and a portion of the wall of the first tube.

As used herein, "a modified surface region" refers to a region of a surface having a different physical property than an adjacent region on that surface, for example, on the interior surface of a plastic tube. Such a region often interacts with a fluid in a different manner than the adjacent region on the surface. For example, a modified surface region can exhibit a different hydrophobicity, hydrophilcity, contact angle, wettability, surface functionality and/or texture. A modified surface region sometimes functions as a wick, and sometimes a modified surface region draws or absorbs a fluid from the adjoining region by capillary action.

A modified surface region sometimes differs from an adjacent surface region by the presence or absence of a coating. In some embodiments, the coating is hydrophilic. In some embodiments, the coating is hydrophobic. Various coatings are known to those skilled in the art.

A surface treatment can be imparted by any suitable method. Numerous methods are known and include, without limitation, irradiation with UV light, electron beams, ion beams and the like; treatment with a glow discharge plasma, barrier discharge or corona discharge; graft polymerization with hydrophilic monomers (including photoinitiated grafting); deposition (printing, ink-jet application, spraying, writing and the like) of hydrophilic polymers; photo/EB-polymerization of deposited hydrophilic monomers/macromonomers; and reaction with oxidizing etchant solutions.

In some embodiments, a surface of a device is treated with corona discharge to modify one or more surface properties. In corona discharge treatment, a current develops from an electrode with a high potential in a neutral gas, such as air. Ionization of the gas generates a layer of plasma around the electrode. The ions generated eventually pass the charge to nearby areas of lower potential, or recombine to form neutral gas molecules. Surfaces of organic films such as polystyrene, polyesters and others may be oxidized when exposed for a short time to the reactive air plasma by corona discharge surface treatment. Corona discharge treatment can increase the oxygen content on the polymer surface and improve wettability.

In some embodiments, a surface of a device is modified by plasma treatment. Plasma treatment often is carried out in a plasma reactor, which is a vacuum vessel with a gas at low pressure, typically 10 to 1000 mTorr. When a high frequency electric field is generated in the reactor, a plasma is formed containing reactive species such as ions, free radicals and vacuum-UV photons. These species can react with a polymer surface and cause a chemical modification with various properties depending on the nature of the gas and the plasma parameters. Gases such as oxygen, ammonia and argon often are used for modification of a surface and can improve adhesion on polymer surfaces. Surface functionality may also be altered via wet chemical methods such as oxidation treatments using perchloric acid or permanganate or partial hydrolysis using strong acids or bases.

A coating may also be applied on each of the surfaces to modify a surface property of a surface of a device, e.g. hydrophobicity, hydrophilicity, or wettabilty. One index of hydrophobicity/hydrophilicity is contact angle of a water droplet on the surface. Contact angle can be measured by techniques well-known in the art. A coating can comprise, for example, a thermoresponsive polymer, pH responsive polymer, or combination thereof. Non-limiting examples of thermoresponsive polymers include poly(N-isopropylacrylamide) (PNIPAM) and poly(di(ethyleneglycol)methylether methacrylate) (PDEGMA). Non-limiting examples of pH responsive polymers include copolymers of acrylic acid, dimethylaminoethylacrylate and hydroxyethylacrylate. A coating may comprise one or more layers.

A variety of methods are available for adding surface coatings. Coatings can be added by ink jet printing, spray painting, or silk screening organic or inorganic compounds with hydrophobic or hydrophilic properties to an area. Coatings can be added by vacuum metalizing or electroless plating of metals to the surface. Coatings can be added by laminating various materials to a surface such as paper, plastics, textiles, or fibers.

Alternatively, or in addition, a modified surface region can be of a different texture than an adjacent region on that surface. The texture can be a pattern such as popcorn texture, bark texture, holes, loops, hooks, weaves, mesh, ridges, fingers, indentations, dimples, hatches and the like. A different texture can be introduced by, for example, molding, stamping, etching or embossing. A texture is applied to a mold used to form a fluid handling device in certain embodiments, and the texture can be applied to such a mold by any known process. A texture can be physically applied using a tool such as a vibrating tool, grinding tool, a laser or sanding tool. For example, texture can be achieved with 70 grit aluminum oxide abrasive application at 100 P.S.I. from a sandblasting tool. A texture can be equivalent to an abrasive grade (e.g., agrit range for sandpaper)and can be about 40 grit to about 2500 grit, about 40-80 grit, about 40-100 grit, about 40-150 grit, about 40-240 grit, about 40-320 grit, about 40-400 grit, about 60-80 grit, about 60-100 grit, about 60-150 grit (e.g., about 40, 50, 60, 80, 100, 120, 150, 180, 220, 240, 280, 320, 400, 500, 600, 800, 1200, 1500, 2000 and 2500 grit), and the like. Increased grit numbers are smoother. The texture can be less that about 400 grit, less than about 320 grit, less than about 240 grit, less that about 200 grit, less than about 180 grit, less than about 150 grit, less than about 100 grit, less that about 90 grit, less that about 80 grit, less that about 70 grit, less that about 60 grit, or less that about 50 grit.

Figure 39:
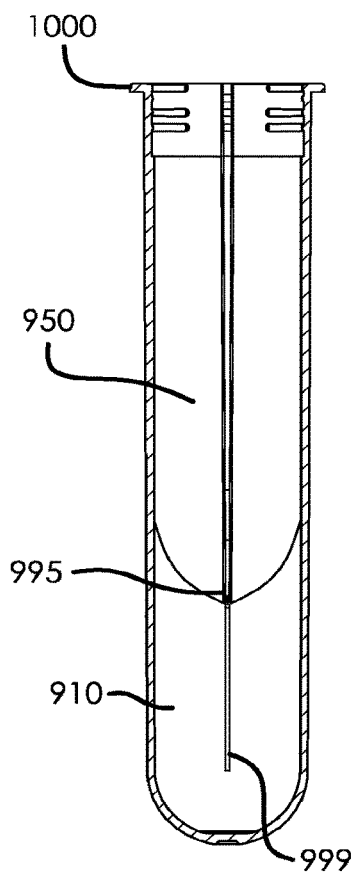
FIG. 39 is a back view thereof (i.e., second tube wall face view)
Figure 40:
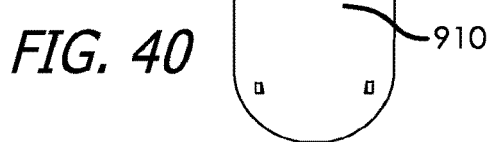
FIG. 40 is a front view thereof (i.e., first tube wall face view)
Figure 41:
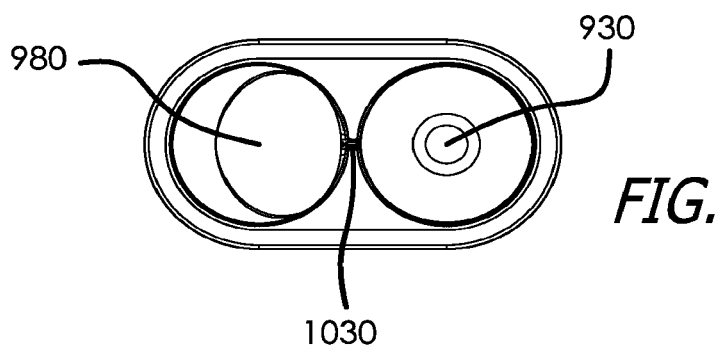
FIG. 41 is a top view (i.e., proximal portion view) thereof.
Figure 42:
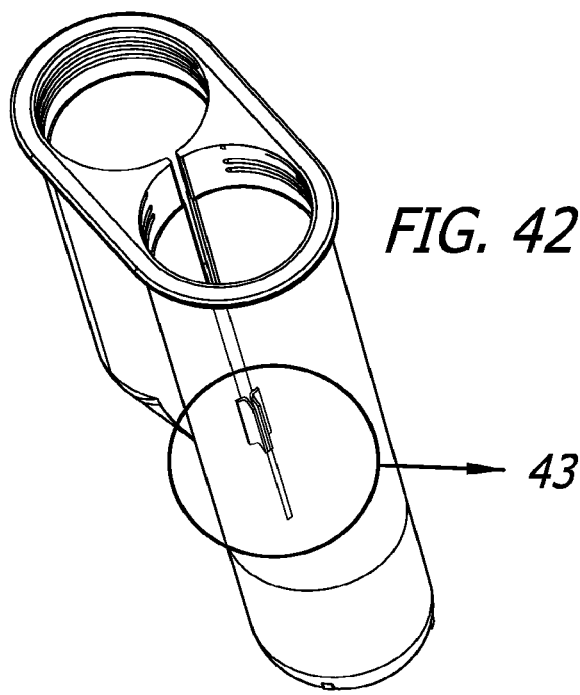
FIG. 42 is a top perspective view; (i.e., proximal portion perspective view)

In certain embodiments, a fluid handling device includes a modified surface region on the interior wall of the first tube (e.g. 999 in FIG. 39) extending from the junction between the second tube bottom and the first tube (e.g. 995). The perimeter of such a modified surface region can be of any suitable geometry, and sometimes the shape of the modified surface region is substantially rectangular (e.g., a strip), square, rhomboid, parallelogram, ovoid, circular, teardrop (e.g., a teardrop shape having a larger width towards the distal tube terminus) and the like. In some embodiments, the modified surface region forms a teardrop shape, where the narrower part of the teardrop shape is towards the proximal terminus of the tube, sometimes co-extensive with the slot bottom, and the same width or narrower than the width of the slot, and the modified surface region flares towards the distal portion of the tube. The length of the modified surface region can be about 0.01 cm to about 3 cm (e.g., about 0.01, 0.05, 0.1, 0.5, 1 or 2 cm in length), and sometimes the length of the modified surface region is at least 0.1 cm, at least 0.2 cm, at least 0.5 cm, 1 cm, or at least 2 cm. The modified surface region can extend to the bottom of the first tube. The width of the modified surface region can be less than about 10 mm, less than about 5 mm, less than about 2 mm, less that about 1 mm, or less than about 0.5 mm.

Figure 43:
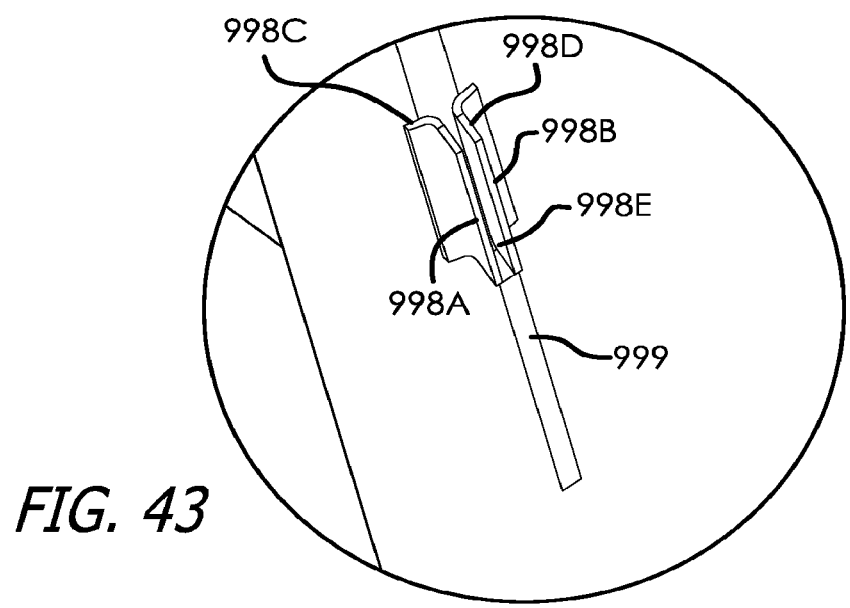
FIG. 43 is an enlarged view of the region encircled in FIG. 42.
Figure 44:
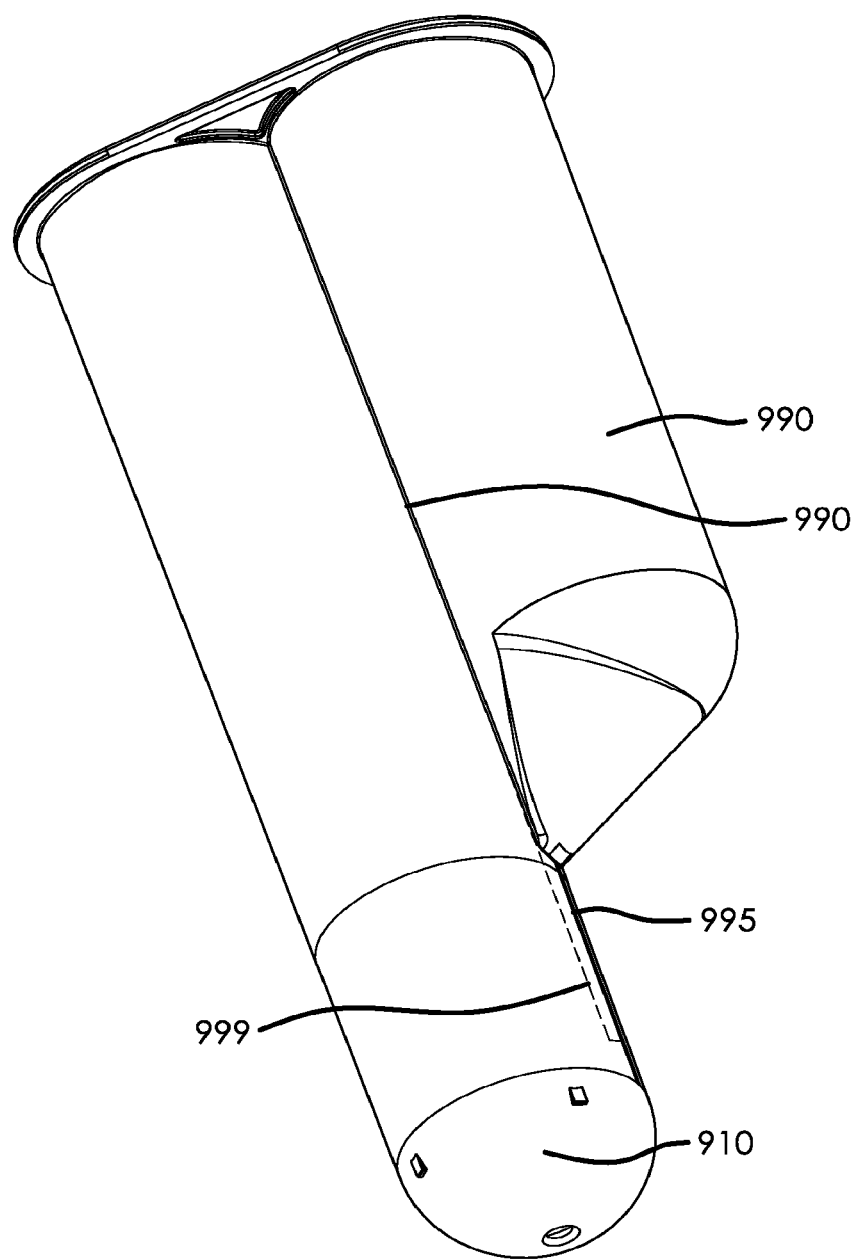
FIG. 44 is a bottom perspective view; (i.e., distal portion perspective view).

In certain embodiments, a fluid handling device further includes a modified surface region of one or more interior surfaces in the junction opening. For example, the interior wall of the junction between the second and first tube extending (e.g. 998A and 998B in FIG. 43) from the junction between the second tube bottom and the first tube (e.g. 995) can include, or can be, a modified surface region. The length of the modified surface in such a region can be at least 0.2 cm, at least 0.5 cm, 1 cm, or at least 2 cm. The width of the modified surface region in the interior wall of the junction between the second and first tube is limited by the width of the junction between the second and first tube.

As another example, the interior surface of the junction between the second tube bottom and the first tube (e.g. 998E in FIG. 43) can include, or can be, a modified surface region. The length and width of the modified surface region in the interior wall of the junction between the second tube bottom and first tube generally is limited by the dimensions of the junction between the second and first tube. In certain embodiments, the modified surface region does not extend into the interior surface of the first tube. In some embodiments, the modified surface region extends into the interior surface of the first tube.

In certain embodiments, a fluid handling device further includes a surface modified region in the interior surface of the second tube extending (e.g. 998C and 998D in FIG. 43) from the junction between the second tube and the first tube (e.g. 990). The length of the modified surface region can be at least 0.1 cm, at least 0.2 cm, at least 0.5 cm, 1 cm, or at least 2 cm. The width of the surface modified region can be less that 10 mm, less than 5 mm, less than 2 mm, less that 1 mm, or less than 0.5 mm. The width of the modified surface region can be the entire circumference of the second tube.

A first tube and/or a second tube, or a fluid handling device having the first tube and the second tube, often independently comprise, consist essentially of, or consist of a polymer. A tube or device consisting essentially of a polymer includes the polymer and about 5% or less (by weight) of a substance other than the polymer (e.g., about 4%, 3%, 2%, 1%, 0.1% 7 0.01% or less (by weight) of a substance other than the polymer). The first tube and the second tube in a fluid handling device often are manufactured from the same polymer, and a fluid handling device often is manufactured from a particular polymer or polymer blend. A polymer utilized sometimes has a haze factor of about 10 or less (e.g., a haze factor of about 9, 8, 7, 6, 5, 4 or less), and sometimes a polymer has a haze factor of about 6 to about 9 (e.g., a haze factor of about 7 or about 8). A polymer utilized sometimes has a haze factor of about 20% or better (e.g., about 15% or better, about 12% or better, about 11% or better, about 10% or better, about 9% or better, about 8% or better, or about 5% or better). A polymer utilized sometimes has a melt flow rate of about 24 grams per ten minutes (g/10 min) or greater (e.g., about 25 g/10 min or greater, about 26 g/10 min or greater, about 27 g/10 min or greater, about 28 g/10 min or greater, about 29 g/10 min or greater, about 30 g/10 min or greater, about 31 g/10 min or greater, about 32 g/10 min or greater, about 33 g/10 min or greater, about 34 g/10 min or greater, about 35 g/10 min or greater, about 36 g/10 min or greater, about 37 g/10 min or greater, about 38 g/10 min or greater, about 39 g/10 min or greater, about 40 g/10 min or greater). In certain embodiments, melt flow rate is a melt flow index, and is determined by the procedure defined in standard ASTM D1238-04c. A polymer sometimes comprises, consists essentially of, or consists of polypropylene, polyethylene, high-density polyethylene, low-density polyethylene, polyethylene teraphthalate, polyvinyl chloride, polytetrafluoroethylene, polystyrene, high-density, acrylnitrile butadiene styrene, crosslinked polysiloxane, polyurethane, (meth) acrylate-based polymer, cellulose, cellulose derivative, polycarbonate, tetrafluoroethylene polymer, the like or combination thereof. A polymer that consists essentially of one or more of the foregoing polymers may include about 5% or less (by weight) of a substance that is not one of the foregoing polymers or combination thereof (e.g., about 4%, 3%, 2%, 1%, 0.1%, 0.01% or less (by weight) of a substance other than one of the foregoing polymers or combination thereof).

A polymer utilized for manufacture of a fluid handling device sometimes is degradable (e.g., biodegradable), a device sometimes includes one or more antimicrobial substances and sometimes a device comprises an anti-static component or material. Degradable materials, antimicrobial substances and anti-static components and materials are known and some are described in International PCT application publication no. WO 2011/116230 (PCT application no. PCT/US2011/028881 filed on Mar. 17, 2011), for example.

Device Components and Configurations

A multiple tube fluid processing device provided herein sometimes includes one or more components useful for processing and/or analyzing a biological fluid, and sometimes includes no such components. In certain embodiments, one or more tubes of a fluid processing device (e.g., the second tube) comprise one or more components that facilitate fluid processing and/or analysis, non-limiting examples of which include a coagulant (e.g., clot activator (e.g., thrombin)), an anticoagulant (e.g., ethylenediaminetetraacetic acid (EDTA, e.g., potassium EDTA), oxalate, sodium citrate, heparin (e.g., sodium or lithium heparin)), a separation medium (e.g., a gel with intermediate density between blood cells and serum), fluoride, citrate, the like, or a combination thereof. In some embodiments, one or more tubes of a device provided herein (e.g., the first tube and/or the second tube) includes one or more components that facilitate detection of an agent in a laboratory assay, non-limiting examples of which include an antibody, enzyme, dye, the like and combination thereof.

A device provided herein sometimes is configured for centrifugation, and is adapted for (i) loading and retention in a centrifuge and (ii) withstanding centrifugation conditions. A multiple tube device sometimes is utilized with a cap covering one or more or all of the tube openings. A cap often is in sealing attachment with the device, sometimes is in sealing attachment with one or more tubes of the device, sometimes is configured for reversible sealing attachment, sometimes is configured for permanent sealing attachment during use by laboratory personnel, and sometimes includes a material that can be sealingly engaged (e.g., pierced) by a needle. A device provided herein sometimes is provided under vacuum (i.e., tubes of the device are under vacuum), which can facilitate drawing of patient blood into a tube of the device (e.g., the second tube).

Device Manufacturing Processes

A fluid handling device may be manufactured by any suitable process. Non-limiting examples of manufacturing processes include thermoforming, vacuum forming, pressure forming, plug-assist forming, reverse-draw thermoforming, matched die forming, extrusion, casting and injection molding.

Injection molding is a manufacturing process for producing objects (e.g., multiple tube fluid handling devices) from thermoplastic (e.g., nylon, polypropylene, polyethylene, polystyrene and the like, for example) and thermosetting plastic (e.g., epoxy and phenolics, for example) materials. A plastic material (e.g., a polymer material) of choice often is fed into a heated barrel, mixed, and forced into a mold cavity where it cools and hardens to the configuration of the mold cavity. The melted material sometimes is forced or injected into the mold cavity, through openings (e.g., a sprue), under pressure. A pressure injection method ensures the complete filling of the mold with the melted plastic. After the mold cools, mold portions are separated, and the molded object is ejected.

A plastic with higher flow and lower viscosity sometimes is selected for use in injection molding processes. Non-limiting examples of plastics with higher flow and lower viscosity include any suitable moldable material having one or more of the following properties: a melt flow rate (230 degrees Celsius at 2.16 kg) of about 30 to about 75 grams per 10 minutes using an ASTM D 1238 test method; a tensile strength at yield of about 3900 to about 5000 pounds per square inch using an ASTM D 638 test method; a tensile elongation at yield of about 7 to about 14% using an ASTM D 638 test method; a flexural modulus at 1% sectant of about 110,000 to about 240,000 pounds per square inch using an ASTM D 790 test method; a notched Izod impact strength (23 degrees Celsius) of about 0.4 to about 4.0 foot pounds per inch using an ASTM D 256 test method; and/or a heat deflection temperature (at 0.455 MPa) of about 160 degrees to about 250 degrees Fahrenheit using an ASTM D 648 test method. Non-limiting examples of materials that can be used include polypropylene, polystyrene, polyethylene, polycarbonate, the like, and mixtures thereof. In some embodiments, additional additives can be included in the plastic or mold to impart additional properties to the final product (e.g., anti-microbial, degradable, anti-static properties). A fluid handling device described herein can be injection molded as a unitary construct.

A mold often is configured to retain molten plastic in a geometry that yields the desired product upon cooling of the plastic. Injection molds sometimes are made of two or more parts. Molds typically are designed so that the molded part reliably remains on the ejector side of the mold after the mold opens, after cooling. The molded part may fall freely away from the mold when ejected from ejector side of the mold. In some embodiments, an ejector sleeve pushes the molded part from the ejector side of the mold.

Also provided herein is a mold for manufacturing a device by an injection mold process, which comprises a body that forms an exterior portion of the device and a member that forms an inner surface of the device. A mold sometimes comprises one or more core pin components that form interior surfaces of the tubes.

Device Uses

A fluid handling device described herein can be used in any suitable manner, and can be utilized in a medical laboratory assay in which a patient biological fluid is processed. In some embodiments, a fluid handling device described herein is utilized in a method for processing and/or analyzing a biological fluid that includes loading a biological fluid into the second tube of the device, which biological fluid comprises a liquid and a solid, under conditions in which the liquid transmits, or substantially transmits, through the junction opening, or portion thereof, into the first tube, and the solid, or portion thereof, is retained or substantially retained in the second tube. Amounts of liquid transmitted or drained into the first tube and solid retained in the second tube are described above.

A biological fluid utilized often is blood, and the blood can be from a human subject (e.g., male or female) or can be from a non-human animal subject (e.g., dog, cat, rodent, ungulate, domesticated animal, non-domesticated animal and the like). Blood collected from a subject often is collected in a container (e.g., vacuum container) and often is transferred from the container in which it was collected to a multiple-tube fluid handling device. Blood may be transferred from the container to the multiple-tube fluid handling device in any suitable manner. Sometimes the blood or a portion thereof is poured from the collection tube into the multiple-tube fluid handling device, and sometimes blood or a portion thereof is transferred to the multiple-tube fluid handling device using a pressure-mediated device (e.g., a pipette, pipettor/pipette tip combination, syringe, the like or combination thereof). A container in which blood is collected can contain one or more components useful for processing and/or analyzing blood, including without limitation, a coagulant (e.g., clot activator (e.g., thrombin)), an anticoagulant (e.g., ethylenediaminetetraacetic acid (EDTA, e.g., potassium EDTA), oxalate, sodium citrate, heparin (e.g., sodium or lithium heparin)), a separation medium (e.g., a gel with intermediate density between blood cells and serum), fluoride, citrate, the like, or a combination thereof. Unprocessed blood, a portion of blood, or blood modified by any suitable process, can be placed into a second tube of a multiple-tube fluid handling device described herein. Non-limiting examples of a portion of blood and processed blood include, without limitation, plasma, serum, a fraction of blood comprising clotting factors, a fraction of blood not comprising clotting factors, buffy coat, a fraction of blood comprising leukocytes, a fraction of blood comprising platelets, and a fraction of blood comprising erythrocytes.

A container in which blood is collected sometimes is subjected to centrifugation for a period of time. A portion of blood often is transferred from the container in which the blood was collected to the multiple-tube fluid handling device after the container has been subjected to centrifugation. In such embodiments, most or all of the blood cells remain in the collection tube and are not transferred to the multiple-tube fluid handling device, and all or a portion of clots present in the blood often are transferred to the multiple-tube fluid handling device. The multiple-tube fluid handling device therefore is useful for separating clots retained in the second tube from liquid (e.g., serum) that drains into the first tube.

A region of reduced thickness present in a multiple-tube fluid handling device typically renders the device useful for analyzing liquid that transmits to the first tube. In some embodiments, visible light, or other suitable radiation (e.g., ultraviolet light, infrared light) is transmitted through one or more of the regions of reduced thickness in the first tube of a multiple-tube fluid handling device. The visible light or other radiation transmitted through the first tube can be detected by a detector. Absorbance or transmission of the light or radiation can be determined, and be used to determine quality of the blood, portion thereof, or modified product thereof processed and analyzed in a multiple-tube fluid handling device described herein. A liquid drained into the first tube of a device described herein may be analyzed further, and often is transferred to another vessel for such further analysis. Liquid transmitted to a first tube of a device described herein can be transferred to another vessel using a suitable transfer process, including without limitation, pouring the liquid into another vessel or transferring the liquid to another vessel using a pressure-mediated device.

Examples of Embodiments

Provided hereafter are non-limiting examples of certain embodiments of the technology.

A1. A multiple tube fluid processing device, comprising:
a first tube comprising a first tube wall, a first tube bottom, a first tube opening, a first tube exterior surface and first tube interior surface;
a second tube comprising a second tube wall, a second tube bottom, a second tube opening, a second tube exterior surface and a second tube interior surface; and
a junction between the first tube and the second tube, which junction comprises a portion of the first tube exterior surface in connection with a portion of the second tube exterior surface, and which junction comprises a junction opening between the first tube interior surface and the second tube interior surface;
which first tube wall comprises a region of reduced wall thickness; and
which first tube and which second tube comprise a polymer.

A2. The device of embodiment A1, wherein the region of reduced wall thickness is disposed in the distal region of the first tube.

A3. The device of embodiment A2, wherein the region of reduced wall thickness is disposed distal to the distal terminus of the junction.

A3.1. The device of any one of embodiments A1 to A3.1, wherein the region of reduced wall thickness is configured as a panel or window.

A3.2. The device of embodiment A3.1, wherein the panel or window comprises a curved surface.

A3.3. The device of embodiment A3.1 or A3.2, wherein the thickness of the panel or window is uniform or substantially uniform.

A4. The device of any one of embodiments A1 to A3.3, wherein the region of reduced wall thickness comprises a thickness step.

A4.1. The device of embodiment A4, wherein the region of reduced wall thickness comprises one thickness step.

A4.2. The device of embodiment A4, wherein the region of reduced wall thickness comprises two thickness steps.

A4.3. The device of any one of embodiments A1 to A4.2, wherein the region of reduced wall thickness comprises a circumferentially-disposed thickness step.

A4.4. The device of embodiment A4.3, wherein all or substantially all of the region of reduced wall thickness is distal to the circumferentially-disposed thickness step.

A4.5. The device of embodiment A4.3 or A4.4, wherein the region of reduced wall thickness comprises one circumferentially-disposed thickness step.

A4.6. The device of embodiment A4.3 or A4.4, wherein the region of reduced wall thickness comprises two circumferentially-disposed thickness steps.

A5. The device of any one of embodiments A1 to A4.6, wherein the region of reduced wall thickness does not comprise an axially-disposed thickness step.

A6. The device of any one of embodiments A1 to A4.6, wherein the region of reduced wall thickness comprises an axially-disposed thickness step.

A7. The device of any one of embodiments A1 to A4.6, wherein the region of reduced wall thickness comprises one axially-disposed thickness step.

A8. The device of any one of embodiments A1 to A4.6, wherein the region of reduced wall thickness comprises two axially-disposed thickness steps.

A8.1. The device of any one of embodiments A1 to A4 and A6 to A8, wherein the region of reduced wall thickness does not comprise a circumferentially-disposed thickness step.

A9. The device of any one of embodiments A1 to A8.1, wherein the first tube comprises one region of reduced wall thickness.

A9.1. The device of any one of embodiments A1 to A8.1, wherein the first tube comprises multiple regions of reduced wall thickness.

A10. The device of embodiment A9.1, wherein the first tube comprises two regions of reduced wall thickness.

A11. The device of embodiment A10, wherein the two regions of reduced wall thickness are disposed on opposing sides of the first tube wall.

A12. The device of any one of embodiments A4 to A11, wherein one or more of the thickness steps are disposed on a portion of the first tube interior surface.

A13. The device of any one of embodiments A4 to A11, wherein one or more of the thickness steps are disposed on a portion of the first tube exterior surface.

A14. The device of any one of embodiments A4 to A11, wherein the thickness steps are disposed on a portion of the first tube exterior surface and a portion of the first tube interior surface.

A15. The device of any one of embodiments A1 to A14, wherein the wall thickness of a region of reduced wall thickness is at least about 0.005 inches less than the wall thickness of an adjacent region not of reduced wall thickness.

A16. The device of any one of embodiments A1 to A14, wherein the wall thickness of a region of reduced wall thickness is at most about 0.005 inches less than the wall thickness of an adjacent region not of reduced wall thickness.

A17. The device of any one of embodiments A1 to A16, wherein the wall thickness of a region of reduced thickness is about 0.035 inches or less.

A18. The device of any one of embodiments A1 to A17, wherein the wall thickness of a region of reduced thickness is about 0.015 inches to about 0.032 inches.

A18.A The device of any one of embodiments A1 to A18, comprising a modified surface region on the interior surface of a transition region between the second tube and the first tube, wherein the transition region comprises a surface of the junction between the second tube and the first tube or a surface adjacent to the junction.

A18.B The device of embodiment A18.A, wherein the modified surface region comprises the interior surface of the first tube extending from the junction between the second tube bottom and the first tube.

A18.C The device of embodiment A18.B, wherein the length of the modified surface region is at least 0.2 cm.

A 18.D The device of embodiment A18.B, wherein the width of the modified surface region is less than 10 mm.

A18.E The device of embodiment A18.A, wherein the modified surface region comprises the interior surface of the junction between the second tube and the first tube extending from the junction between the second tube bottom and the first tube.

A18.F The device of embodiment A18.E, wherein the length of the modified surface region is at least 0.2 cm.

A18.G The device of embodiment A18.E, wherein the modified surface region does not extend into the interior surface of the first tube.

A18.H The device of embodiment A18.A, wherein the modified surface region comprises the interior surface of the interior wall of the second tube extending from the junction between the second tube and the first tube.

A18.I The device of embodiment A18.H, wherein the length of the modified surface region is at least 0.2 cm.

A18.J The device of embodiment A18.H, wherein the width of the modified surface region is less than 2 mm.

A18.K The device of embodiment A18.A, wherein the modified surface region comprises the interior surface of the junction between the second tube bottom and the first tube.

A18.L The device of any one of embodiments A18.A to A18.K, wherein the modified surface region comprises a coating.

A18.M The device of any one of embodiments A18.A to A18.L, wherein the modified surface region comprises a texture.

A18.N The device of embodiment A18.M, wherein the texture is equivalent to about 40 grit to about 400 grit.

A19. The device of any one of embodiments A1 to A18, wherein the first tube and the second tube comprise the polymer.

A20. The device of embodiment A19, wherein the first tube and the second tube consist essentially of the polymer.

A21. The device of embodiment A20, wherein the first tube and second tube consist of the polymer.

A22. The device of any one of embodiments A19 to A21, wherein the first tube and the second tube are manufactured from the same polymer.

A23. The device of any one of embodiments A19 to A21, wherein the device is manufactured from one polymer.

A24. The device of any one of embodiments A1 to A23, wherein the polymer has a haze factor of about 10 or less.

A25. The device of embodiment A24, wherein the polymer has a haze factor of about 6 to about 9.

A25.1. The device of any one of embodiments A1 to A23, wherein the polymer has a haze factor of about 20% or better.

A25.2. The device of embodiment A25.1, wherein the polymer has a haze factor of about 10%.

A25.3 The device of any one of embodiments A19 to A25.2, wherein the polymer has a melt flow rate of about 24 g/10 min or greater.

A25.4. The device of embodiment A25.3, wherein the polymer has a melt flow rate of about 31 g/10 min or greater.

A26. The device of any one of embodiments A1 to A25, wherein the polymer comprises polypropylene, polyethylene, high-density polyethylene, low-density polyethylene, polyethylene teraphthalate, polyvinyl chloride, polytetrafluoroethylene, polystyrene, high-density, acrylnitrile butadiene styrene, crosslinked polysiloxane, polyurethane, (meth)acrylate-based polymer, cellulose, cellulose derivative, polycarbonate, tetrafluoroethylene polymer or combination thereof.

A27. The device of embodiment A26, wherein the polymer consists essentially of polypropylene, polyethylene, high-density polyethylene, low-density polyethylene, polyethylene teraphthalate, polyvinyl chloride, polytetrafluoroethylene, polystyrene, high-density, acrylnitrile butadiene styrene, crosslinked polysiloxane, polyurethane, (meth)acrylate-based polymer, cellulose, cellulose derivative, polycarbonate, tetrafluoroethylene polymer or combination thereof.

A28. The device of embodiment A27, wherein the polymer consists of polypropylene, polyethylene, high-density polyethylene, low-density polyethylene, polyethylene teraphthalate, polyvinyl chloride, polytetrafluoroethylene, polystyrene, high-density, acrylnitrile butadiene styrene, crosslinked polysiloxane, polyurethane, (meth)acrylate-based polymer, cellulose, cellulose derivative, polycarbonate, tetrafluoroethylene polymer or combination thereof.

A29. The device of any one of embodiments A1 to A28, wherein the first tube bottom comprises a rounded bottom portion or a substantially rounded bottom portion.

A30. The device of embodiment A29, wherein the second tube bottom comprises a rounded portion, or substantially rounded portion, and a conical portion, or substantially conical portion.

A31. The device of any one of embodiments A1 to A30, wherein the second tube bottom comprises a sloped surface, whereby the portion of the second tube bottom that connects to the first tube wall is distal to an opposing portion of the second tube bottom.

A32. The device of embodiment A31, wherein the sloped surface is configured to transmit fluid by gravity from the second interior to the first interior through the junction opening.

A33. The device of any one of embodiments A1 to A32, wherein the distal exterior portion of the second tube bottom connects to the first tube wall at a distal terminus of the junction.

A34. The device of embodiment A33, wherein the region of reduced wall thickness is disposed distal to the distal terminus of the junction.

A35. The device of any one of embodiments A1 to A34, wherein the junction opening comprises a first tube junction opening terminus at a portion of the first tube interior surface and a second tube junction opening terminus at a portion of the second tube interior surface.

A36. The device of any one of embodiments A1 to A35, wherein the junction opening is configured to permit a liquid in the second tube interior to transmit, or substantially transmit, from the second tube interior to the first tube interior through the junction opening, and not permit a solid in the second tube interior to transmit, or substantially transmit, to the first tube interior through the junction opening.

A37. The device of embodiment A36, wherein the fluid is blood or a fraction thereof and the solid is a blood clot.

A38. The device of any one of embodiments A1 to A37, wherein the junction opening is an axially-disposed slit.

A39. The device of embodiment A38, wherein one end of the slit is disposed at the proximal terminus of the first tube and the other end of the slit is disposed at the distal terminus of the second tube.

A40. The device of embodiment A38 or A39, wherein the junction opening has a tapered width.

A41. The device of embodiment A40, wherein the width is about 0.35 inches to about 0.41 inches at the widest portion and about 0.014 inches to about 0.020 inches at the narrowest portion.

A42. The device of any one of embodiments A1 to A41, wherein the first tube opening and the second tube opening are coincident.

A43. The device of any one of embodiments A1 to A42, comprising a flange disposed at the proximal terminus of the device.

A44. The device of any one of embodiments A1 to A43, wherein the first tube wall or the second tube wall, or the first tube wall and the second tube wall, comprise an annular rib or partial annular rib disposed on a surface of the wall, which partial annular rib traverses a portion of the wall circumference.

A45. The device of embodiment A44, wherein the rib is disposed on an interior surface of the wall B1. A method for processing a biological fluid, comprising:
  loading a biological fluid into the second tube of the device of any one of embodiments A1 to A45, which biological fluid comprises liquid and solids, under conditions in which the liquid transmits through the junction opening, or portion thereof, into the first tube, and the solids, or portion thereof, are retained or substantially retained in the second tube.

B2. The method of embodiment B1, comprising transmitting light through one or more of the regions of reduced thickness.

B3. The method of embodiment B2, comprising detecting the light transmitted through the first tube.

B4. The method of any one of embodiments B1 to B3, wherein the biological fluid is blood or a fraction thereof.

B5. The method of embodiment B4, wherein the fraction is chosen from plasma, serum, a fraction of blood comprising clotting factors, a fraction of blood not comprising clotting factors, buffy coat, a fraction of blood comprising leukocytes, a fraction of blood comprising platelets, and a fraction of blood comprising erythrocytes.

C1. A mold comprising surfaces configured to manufacture a device of any one of embodiments A1 to A45 by an injection molding process.

D1. A method for manufacturing a device of any one of embodiments A1 to A45, comprising:
  injecting a moldable polymer into a mold configured to manufacture a device of any one of embodiments A1 to A45; and
  removing the device from the mold after the polymer has hardened or substantially hardened.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents.

Modifications may be made to the foregoing without departing from the basic aspects of the technology. Although the technology has been described in substantial detail with reference to one or more specific embodiments, those of ordinary skill in the art will recognize that changes may be made to the embodiments specifically disclosed in this application, yet these modifications and improvements are within the scope and spirit of the technology.

The technology illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and use of such terms and expressions do not exclude any equivalents of the features shown and described or portions thereof, and various modifications are possible within the scope of the technology claimed. The term "a" or "an" can refer to one of or a plurality of the elements it modifies (e.g., "a reagent" can mean one or more reagents) unless it is contextually clear either one of the elements or more than one of the elements is described. The term "about" as used herein refers to a value within 10% of the underlying parameter (i.e., plus or minus 10%), and use of the term "about" at the beginning of a string of values modifies each of the values (i.e., "about 1, 2 and 3" refers to about 1, about 2 and about 3). For example, a weight of "about 100 grams" can include weights between 90 grams and 110 grams. Further, when a listing of values is described herein (e.g., about 50%, 60%, 70%, 80%, 85% or 86%) the listing includes all intermediate and fractional values thereof (e.g., 54%, 85.4%). Thus, it should be understood that although the present technology has been specifically disclosed by representative embodiments and optional features, modification and variation of the concepts herein disclosed may be resorted to by those skilled in the art, and such modifications and variations are considered within the scope of this technology.

Certain embodiments of the technology are set forth in the claim(s) that follow(s).

What is claimed is:

1. A method for manufacturing a multiple tube fluid processing device, comprising:
  injecting a moldable polymer into a mold configured to manufacture a multiple tube fluid processing device, wherein the device comprises:
    a first tube comprising a first tube wall, a first tube bottom, a first tube opening, a first tube exterior surface and first tube interior surface;
    a second tube comprising a second tube wall, a second tube bottom, a second tube opening, a second tube exterior surface and a second tube interior surface; and
    a junction between the first tube and the second tube, which junction comprises a portion of the first tube exterior surface in connection with a portion of the second tube exterior surface, and which junction comprises a junction opening between the first tube interior surface and the second tube interior surface; and
    which first tube wall comprises a region of reduced wall thickness comprising a panel or window; and
  removing the device from the mold after the polymer has hardened or substantially hardened, wherein the polymer is not polyethylene terephthalate (PET).

2. The method of claim 1, wherein the polymer has a haze factor of about 10 or less.

3. The method of claim 2, wherein the polymer has a haze factor of about 6 to about 9.

4. The method of claim 3, wherein the polymer has a haze factor of about 7 or about 8.

5. The method of claim 1, wherein the polymer has a haze factor of about 20% or better.

6. The method of claim 5, wherein the polymer has a haze factor of about 10%.

7. The method of claim 1, wherein the polymer has a melt flow rate of about 24 g/10 min or greater.

8. The method of claim 7, wherein the polymer has a melt flow rate of about 31 g/10 min or greater.

9. The method of claim 1, wherein the polymer comprises polypropylene, polyethylene, high-density polyethylene, low-density polyethylene, polyvinyl chloride, polytetrafluoroethylene, polystyrene, high-density, acrylnitrile butadiene styrene, crosslinked polysiloxane, polyurethane, (meth)

acrylate-based polymer, cellulose, cellulose derivative, polycarbonate, tetrafluoroethylene polymer or combination thereof.

10. The method of claim 9, wherein the polymer consists essentially of polypropylene, polyethylene, high-density polyethylene, low-density polyethylene, polyvinyl chloride, polytetrafluoroethylene, polystyrene, high-density, acrylnitrile butadiene styrene, crosslinked polysiloxane, polyurethane, (meth)acrylate-based polymer, cellulose, cellulose derivative, polycarbonate, tetrafluoroethylene polymer or combination thereof.

11. The method of claim 10, wherein the polymer consists of polypropylene, polyethylene, high-density polyethylene, low-density polyethylene, polyvinyl chloride, polytetrafluoroethylene, polystyrene, high-density, acrylnitrile butadiene styrene, crosslinked polysiloxane, polyurethane, (meth)acrylate-based polymer, cellulose, cellulose derivative, polycarbonate, tetrafluoroethylene polymer or combination thereof.

12. The method of claim 1, wherein polymer is a single polymer.

13. The method of claim 12, wherein the polymer is polypropylene.

\* \* \* \* \*